(12) United States Patent
Dickens et al.

(10) Patent No.: US 9,924,129 B2
(45) Date of Patent: Mar. 20, 2018

(54) DIGITAL VIDEO TRANSMISSION

(75) Inventors: Nigel Dickens, Cambridge (GB);
Anthony Field, Cambridge (GB);
Julian Brown, Cambridge (GB)

(73) Assignee: Adder Technology Limited, Cambridge (GB)

( * ) Notice: Subject to any disclaimer, the term of this patent is extended or adjusted under 35 U.S.C. 154(b) by 839 days.

(21) Appl. No.: 13/440,697

(22) Filed: Apr. 5, 2012

(65) Prior Publication Data
US 2012/0257680 A1    Oct. 11, 2012

(30) Foreign Application Priority Data

Apr. 6, 2011  (GB) .................................. 1105835.1

(51) Int. Cl.
| | | |
|---|---|---|
| *H04N 5/775* | (2006.01) | |
| *H04N 21/43* | (2011.01) | |
| *H04N 21/4363* | (2011.01) | |
| *H04N 7/10* | (2006.01) | |
| *G09G 5/00* | (2006.01) | |

(52) U.S. Cl.
CPC ............. *H04N 5/775* (2013.01); *G09G 5/006* (2013.01); *G09G 5/008* (2013.01); *H04N 7/108* (2013.01); *H04N 21/4305* (2013.01); *H04N 21/43632* (2013.01); *G09G 2330/026* (2013.01); *G09G 2360/02* (2013.01); *G09G 2370/04* (2013.01);
(Continued)

(58) Field of Classification Search
CPC .... G09G 5/008; G09G 2370/04; G09G 5/006; G09G 2330/026; G09G 2360/02; G09G 2370/047; G09G 2370/12; H04N 21/4305; H04N 7/108; H04N 5/775; H04N 21/43632
See application file for complete search history.

(56) References Cited

U.S. PATENT DOCUMENTS

| | | | |
|---|---|---|---|
| 6,735,658 B1 * | 5/2004 | Thornton | G06F 13/409 710/2 |
| 7,102,629 B2 * | 9/2006 | Bae | G09G 5/006 345/204 |

(Continued)

FOREIGN PATENT DOCUMENTS

EP         1 381 235         1/2004

OTHER PUBLICATIONS

Search Report dated Aug. 2, 2012 from Application No. GB1105835.1.

*Primary Examiner* — Mohammed Rahaman
*Assistant Examiner* — Kehinde O Abimbola
(74) *Attorney, Agent, or Firm* — Beyer Law Group LLP

(57) ABSTRACT

A method and system for supplying a digital video signal from a source to a sink are described. The digital video signal includes digital video data for three different colors and a pixel clock signal, such as DVI and HDMI. The digital video data and the pixel clock signal are received at a transmitter which sends a signal representative of the frequency of the pixel clock signal over a cable connecting the transmitter and a receiver. Digital video data for three different colors is sent over three different twisted wire pairs of the cable to the receiver. A local pixel clock signal is generated at the receiver using the signal representative of the frequency of the pixel clock signal. The local pixel clock signal is used to process the received digital video data and recovered digital video data and the local pixel clock signal are output.

16 Claims, 13 Drawing Sheets

(52) U.S. Cl.
CPC ... *G09G 2370/047* (2013.01); *G09G 2370/12* (2013.01)

(56) References Cited

U.S. PATENT DOCUMENTS

| | | | | |
|---|---|---|---|---|
| 7,295,578 | B1* | 11/2007 | Lyle | G06F 3/14 |
| | | | | 348/473 |
| 7,683,896 | B2* | 3/2010 | Odryna | G09G 5/006 |
| | | | | 345/204 |
| 8,081,705 | B2* | 12/2011 | Kirkpatrick | H03M 5/145 |
| | | | | 327/52 |
| 8,798,189 | B2* | 8/2014 | Kirkpatrick | H03M 5/145 |
| | | | | 327/52 |
| 2002/0044147 | A1 | 4/2002 | Martin | |
| 2003/0043141 | A1* | 3/2003 | Bae | G09G 5/006 |
| | | | | 345/211 |
| 2003/0048851 | A1 | 3/2003 | Hwang et al. | |
| 2005/0034172 | A1* | 2/2005 | Nohara | H04N 7/22 |
| | | | | 725/147 |
| 2006/0069829 | A1* | 3/2006 | Thornton | H04N 9/67 |
| | | | | 710/106 |
| 2006/0262226 | A1* | 11/2006 | Odryna | G09G 5/006 |
| | | | | 348/646 |
| 2009/0323831 | A1* | 12/2009 | Kirkpatrick | H03M 5/145 |
| | | | | 375/258 |
| 2012/0057642 | A1* | 3/2012 | Kirkpatrick | H03M 5/145 |
| | | | | 375/258 |

* cited by examiner

DIGITAL VIDEO TRANSMISSION

The present invention relates to apparatus and methods for transmitting digital video signals, and in particular to apparatus and methods for reducing the number of communications channels needed for transmitting digital video signals over longer distances in a manner that still enables the digital video to be reliably displayed.

There are a wide number of applications in which it is useful to be able to transmit video signals from a source of video to a sink of video, such as 'extender' products, KVM devices and signage. Various types of devices may provide the source of video, e.g. computers, media players, etc., and typically the sink of video will be a display device, such as a computer monitor or television, or may also be a media recorder. Often, a cable is used to connect the source and sink device and to provide various signal paths or channels to transmit video data from the source to the sink and sometimes also to allow other data and/or control signals to be sent between the sink and source devices.

Historically, the video signal format has been analogue, but increasingly various digital video signal formats are being used and introduced. There are issues arising when transmitting video signals over reasonably large distances, i.e., 10s or 100s of meters. These issues include electrical interference, video signal degradation and video signal skew. Interference can be mitigated by transmitting signals differentially over a twisted pair of wires and shielding the cable. Signal degradation depends on the wire path length and the strength of the signal being sent. Sometimes, this problem can be addressed by providing amplifiers or boosters to increase the signal strength. Skew arises from the fact that if different signals are sent over different paths, then those different paths will usually have a different length and so timing differences can arise in the transmitted signals owing to the different path lengths.

Many of these issues are less of a problem for analogue video signals as errors in the transmitted video signal will not necessarily be apparent in the displayed video image or will merely appears as slight video colour misalignments or other artifacts in the displayed image. However, for digital video signals, by their nature, if received data is wrong or missing, then this can prevent the image being displayed in its entirety. Further, the bandwidth needed to transmit analogue video signals is typically far less than the bandwidth required to transmit digital video signals, particularly if very large or high resolution images are being transmitted. For example, the bandwidth needed to transmit a digital video signal would typically be in the order of ten times more than for an analogue signal. Therefore, there are significant technical problems in transmitting digital video signals by wire over reasonably long distances.

The cabling used to connect the sink and source devices can also give rise to various problems when the devices are separated by long distances. There is increased cost owing to the material present in the cable. There can be practical problems in routing the cable (for example in a building). If multiple devices are being connected using multiple cables, then a bundle of multiple cables can also be difficult to route or accommodate. Further, as the thickness of a cable increases, with an increased number of internal wires, it can be more prone to damage through bending. Therefore, it is often desirable to reduce the number of separate communication channels present in the cable so as to reduce the thickness of an individual cable and/or the number of cables being used.

A well known type of cable is what is colloquially referred to as 'Ethernet' cabling which comprises four twisted wire pairs, sometimes with shielding and sometimes without shielding, and terminated at each end by a connector, often an RJ45 type connector (although other connector types also exist, such as GG45, ARJ45 and Siemens Tera connector). Various standards for this type of cable are known, e.g., CAT 5, CAT5e, CAT6, etc. and upwards. Such four-twisted pair cables are well known and familiar and are generally well suited to various practical applications. As discussed above, many applications of digital video signal transmission also require the presence of a data and/or control channel to pass signals auxiliary to the video signals. Hence, using a four twisted wire pair cable, a one of the twisted wire pairs can be used as the physical path for the auxiliary channel which then leaves three twisted wire pairs to provide three separate channels for the digital video signal. A colour digital video signal typically has three different colour components, e.g. RGB or YCbCr, and so data for each colour can be sent along a respective one of the three twisted pairs. However, some digital video interfaces also require a timing reference or clock signal in order to allow the video image to be reconstituted from the colour data.

One approach would be to use a five twisted wire pair cable, but such cabling and connectors are not widely available nor familiar and source and sink devices would need to be modified to have suitable connectors added. Also, such cabling would be thicker, take up more space, be more difficult to handle and more costly. Another approach would be to use the four twisted wire pairs to transmit the three colour signals and the timing signal. However, there would then be no auxiliary channel for other data or control signals. Obviously a further separate single twisted wire pair cable could be used to provide the auxiliary channel, but this would increase the number of cables that need to be used, increasing cost and causing problems in routing and handling cabling, particularly for large numbers of connected devices.

It would therefore be beneficial to be able to reduce the number of separate communications channels needed to transmit a digital video signal over a reasonably long distance so that the transmitted image can be reliably displayed.

The present invention allows all the digital video information needed to reliably transmit and display a digital video signal over three twisted wire pairs. The invention achieves this by not transmitting the timing reference signal at the same time as the three colour signals. Instead, information about the timing reference signal is sent separately from the three colour signals. The information about the timing reference signal is then used to reconstitute the timing reference signal from the received colour signals.

Hence, only three twisted wire pairs are needed to transfer the digital video colour data to be displayed. This means that a cable with a reduced number of twisted wire pairs can be used, for example three or multiples of three, or other twisted wire pairs in the cable are freed up to be used for other purposes, e.g. as an auxiliary data and/or control communication channel, for example in a four twisted wire pair cable.

According to a first aspect of the invention, there is provided a method for supplying a digital video signal from a source of digital video to a sink of digital video. The digital video signal includes digital video data for three different colours and a pixel clock signal. The digital video data and the pixel clock signal are received at a transmitter. The transmitter sends a signal representative of the frequency of the pixel clock signal over a cable connecting the transmitter and a receiver. Digital video data for three different colours are sent over three different twisted wire pairs of the cable from the transmitter to the receiver. The receiver generates a local pixel clock signal using or based on the signal representative of the frequency of the pixel clock signal. The local pixel clock signal may be used to process the received digital video data sent over the three different twisted wire pairs, for example to recover the digital video data. The digital video data and the local pixel clock signal may then be output.

Hence, the pixel clock signal may not be sent at the same time as the digital video data to be displayed. Rather, a signal from which the frequency of the original pixel clock signal can be directly or indirectly obtained is sent over the cable at some stage to the receiver, and the receiver generates a local pixel clock frequency. That local pixel clock frequency can then be output by the receiver together with the received video data to reconstitute the originally digital video signal.

The signal representative of the frequency of the pixel clock signal can be sent before the digital video colour data. In that case, the signal representative of the frequency of the pixel clock signal can be sent on a one or more of the twisted wire pairs subsequently used for transmitting the digital video colour data.

The signal representative of the frequency of the pixel clock signal can be sent at the same time as some of the digital video colour data. In that case, the signal representative of the frequency of the pixel clock signal can be sent on a fourth one of the twisted wire pairs while at least some digital video colour data is being transmitted. However, the once enough information has been sent to the receiver for it to generate a local pixel clock, the fourth twisted wire pair can be used to send other data or control signals. Hence, the signal representative of the frequency of the pixel clock signal does not need to be sent all the time that the colour data is being sent and output for display. Therefore, the fourth twisted wire pair can be used for other purposes.

The signal representative of the frequency of the pixel clock signal can be a signal representing the measured frequency of the original pixel clock signal. The signal representative of the frequency of the pixel clock signal can be the original pixel clock signal or a processed version of the original pixel clock signal. The signal representative of the frequency of the pixel clock signal can be based on or derived from the original pixel clock signal.

The local pixel clock can be directly or indirectly generated from the transmitted signal representative of the frequency of the pixel clock signal. The local pixel clock can be generated from or based on a measurement of the transmitted signal representative of the frequency of the pixel clock signal or a signal derived from the transmitted signal representative of the frequency of the pixel clock signal.

The signal representative of the frequency of the pixel clock signal can be transmitted on one or more of the three twisted wire pairs used to send the digital video data or on a fourth one of the twisted wire pairs of the cable.

The local pixel clock signal can be used to start processing the received digital video data. Processing of the received digital video data can produce a recovered pixel clock signal. The recovered pixel clock signal can be output as the local pixel clock signal or in place of the originally output local clock signal.

The signal representative of the frequency of the pixel clock frequency can be the pixel clock signal. The signal representative of the frequency can be sent over a one of the three twisted wire pairs of the cable before sending the digital video data. The method can further comprise measuring the frequency of the pixel clock signal transmitted over the twisted wire pair at the receiver. The local pixel clock signal can be generate or synthesised at the measured frequency.

The method can further comprise de-jittering the pixel clock signal before transmission. The method can further comprise de-jittering the local pixel clock signal before using the local pixel clock signal to process the received digital video data.

The method can further comprise: using or switching to using a recovered pixel clock signal to process the received digital video data to recover the digital video data.

The digital video data can be sent in an encoding format having a higher average number of bit transitions per data word than an original encoding format in which the digital video data was originally received by the transmitter from the source.

The method can further comprise decoding the digital video data from an original encoding format, encoding the digital video data in a second encoding format having a higher average number of bit transitions per data word and sending the digital video data encoded in the second encoding format. The method can further comprise decoding the digital video data from the second encoding format and encoding the digital video data in the original encoding format.

Each encoding format can be an 8 bit/10 bit encoding format. The original encoding format can be TMDS. The encoding format or second encoding format can be 8b10b.

The method can further comprise identifying the location of data word boundaries in the digital video data. Data word boundaries can be identified by identifying a bit pattern corresponding to a control data word at the receiver and/or at the transmitter.

Identifying the location of data word boundaries can include identifying the same bit pattern at a fixed position within different consecutive parts of the digital video data a plurality of consecutive times.

The method can further comprise aligning data words for the different colours corresponding to the same pixel. Aligning data words can included identifying a data word corresponding to a control data word. Aligning data words can further include identifying the same data word in digital video data for each colour or identifying a sequence of data words in digital video data for each colour. Aligning data words can also include determining a timing off set for two of the colours relative to the third colour.

The method can further comprise de-serializing the digital video data into parallel digital video data for each colour and/or processing the parallel digital video data and/or re-serializing the parallel digital video data into serial digital video data for each colour and/or sending the serial digital video data from the transmitter to the receiver and/or de-serializing the digital video data into parallel digital video data for each colour and/or processing the parallel digital video data and/or re-serializing the parallel digital video data into serial digital video data for each colour.

The pixel clock signal can be not sent from the transmitter to the receiver at the same time that the digital video data is sent from the transmitter to the receiver.

The pixel clock signal can be sent from the transmitter to the receiver at the same time that digital video data is sent from the transmitter to the receiver, but not while digital video data is being output for display by the transmitter.

The digital video signal can be a DVI signal or a HDMI signal.

The method can further comprise sending auxiliary control signals or data signals over a fourth twisted wire pair of the cable. The method may further comprise at least one of: operating the fourth twisted wire pair as a transparent USB connection or operating the fourth twisted wire pair as an i2c connection or sending electrical power over the fourth twisted wire pair or sending keyboard and/or mouse signals over the fourth twisted wire pair.

A further aspect of the invention provides a system for supplying a digital video signal from a source of digital video to a sink of digital video, wherein the digital video signal includes digital video data for three different colours and a pixel clock signal. The system can comprise a transmitter connectable to a source of digital video, a receiver connectable to a sink of digital video and a cable connectable to the transmitter and the receiver and including at least three twisted wire pairs. The transmitter and receiver can include between them circuitry configured or adapted to carry out the method aspect of the invention and any preferred or other features thereof.

A further aspect of the invention provides a transmitter for supplying a digital video signal from a source of digital video to a sink of digital video, wherein the digital video signal includes digital video data for three different colours and a pixel clock signal. The transmitter can include an input for receiving digital video from the source of digital video, an output connectable to a cable for connecting the transmitter to a receiver and circuitry to provide a signal representative of the frequency of the pixel clock signal. The circuitry can also send the signal representative of the frequency of the pixel clock signal to the output for transmission over the cable. The transmitter can also include circuitry to send digital video data for three different colours to the output for transmission over three different twisted wire pairs of the cable.

A further aspect of the invention provides a receiver for supplying a digital video signal from a source of digital video to a sink of digital video, wherein the digital video signal includes digital video data for three different colours and a pixel clock signal. The receiver can include an output for passing digital video to the sink of digital video, an input connectable to a cable for connecting the receiver to a transmitter and circuitry to receive digital video data for three different colours from the input which has been transmitted over three different twisted wire pairs of the cable and circuitry to generate a local pixel clock signal using a signal representative of the frequency of the pixel clock signal received over the cable. The circuitry can also process received digital video data using the local pixel clock to recover the digital video data and to output the recovered digital video data and the local pixel clock signal.

The system, transmitter and receiver aspects of the invention may include features corresponding to the preferred features of the method aspect of the invention.

Embodiments of the invention will now be described in detail, by way of example only, and with reference to the accompanying drawings, in which.

Figure 1:
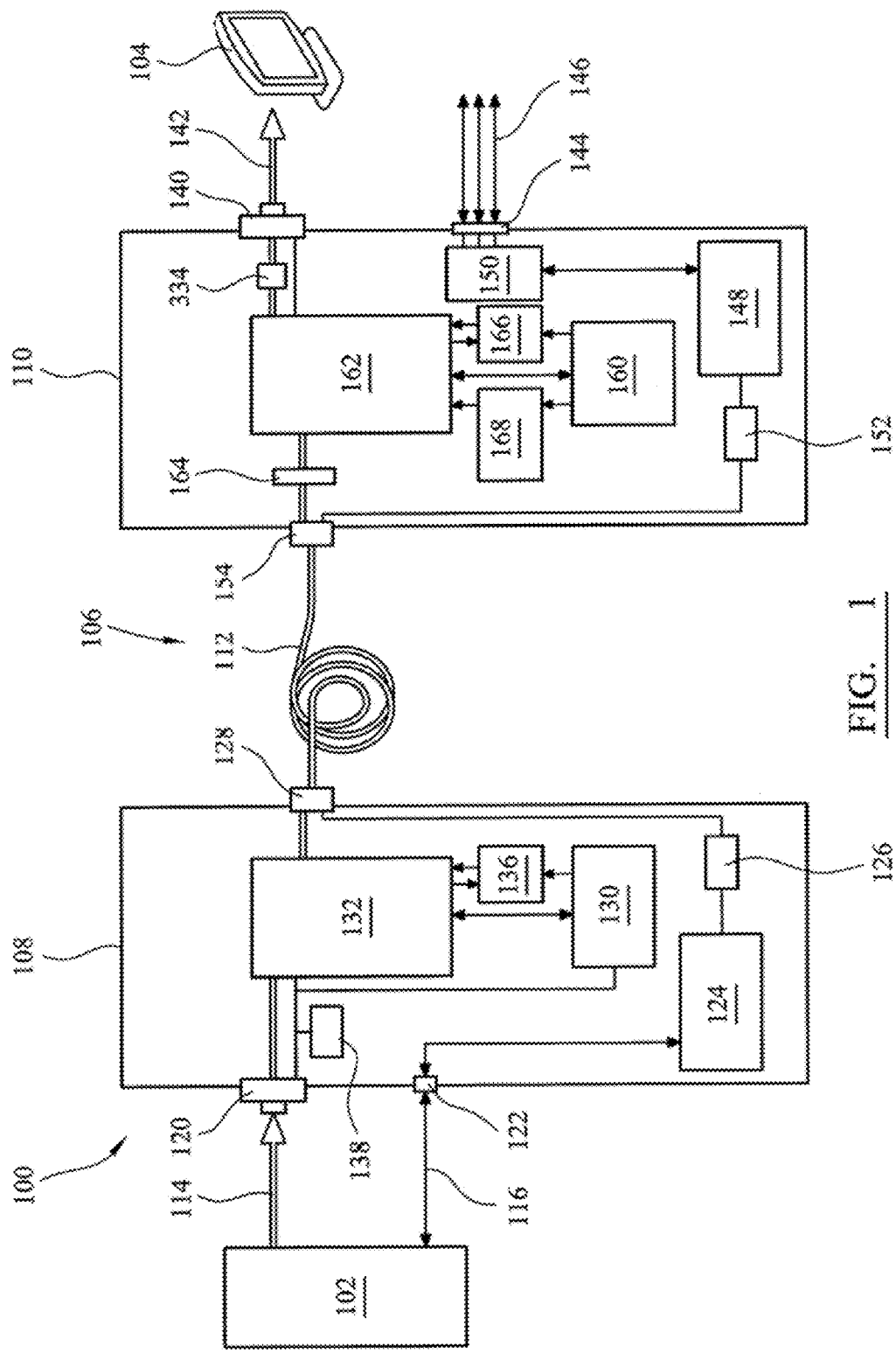
FIG. 1 shows a schematic block diagram of a digital video extender system according to the invention, including transmitters and receivers according to the invention and operating according to methods of the invention.

Similar items in the different Figures share common reference numerals unless indicated otherwise.

The following embodiments of the invention are described with reference to the Digital Visual Interface (DVI), but it will be appreciated can be applied to other digital video interfaces employing three colour signals and a timing reference signal or clock signal, such as the High-Definition Multimedia Interface (HDMI). Although HDMI supports other functionality, such as audio, a consumer electronics control (CEC) connection and an Ethernet data connection, both DVI and HDMI use three digital colour signals and a clock signal which are sent using Transition Minimised Differential Signalling (TMDS). Both HDMI and DVI use TMDS to send 10-bit characters or words. Hence, the invention can be used with both DVI and HDMI devices as sources or sinks of video data. In the case of HDMI, the specific embodiment would need adapting to handle the non-video signals supported by HDMI, compared to DVI, for example by providing circuitry to interpret audio signals within the video sync periods. Further, as described below, a transparent i2c link can be provided to support HDCP.

TMDS encoding is a form of eight-bit/ten-bit encoding but uses a different code-set to that of the original form of 8b/10b as introduced by IBM corporation in the 19802. In TMDS encoding a two-stage process converts an input of 8 bits into a 10 bit code with particular desirable properties. The 10-bit TMDS symbol or word can represent either an 8-bit data value during normal data transmission, or 2 bits of control signals during screen blanking. Of the 1,024 possible combinations of the 10 transmitted bits, 460 combinations are used to represent an 8-bit data value, 4 combinations are used for representing 2 bits of control signals (such as HSync and VSync) and the remaining 560 remaining combinations are reserved and forbidden. Within the specification "TMDS encoding" will generally be used to refer to the specific form of 8-bit/10 bit encoding/decoding used by DVI and HMDI and "8b/10b" will generally be used to refer to the conventional 8b/10b encoding/decoding format.

With reference to FIG. 1 there is shown a digital video system 100 according to the invention. The system 100 includes a source of digital video data in the form of a computer 102 having a video card generating a DVI output. The system 100 includes a sink of digital video data in the form of a video display device or monitor 104 which can accept a DVI input. A digital video transmission system 106 according to the invention and in the form of a single-link DVI extender is provided between the computer 102 and the video display device 104. The digital video transmission system includes a transmitter 108 and a receiver 110 connected by a 50 m length of CAT6 (or higher) shielded, four twisted wire pair cable 112 terminated in an RJ45 connector at each end. However, shielding of the four twisted wire pair cable is not essential in order for the system to work. Also, other cable connectors can be used (such as GG45, ARJ45 and Siemens Teva) which may provide improved performance due to their reduced cross talk. Hence, the extender 106 can provide an up to 50 m extension to the separation between the computer 102 and display device 104.

In other embodiments, the cable 112 can have other lengths less than 50 m or greater than 50 m. However, for the specific embodiment described there is a maximum practical working length of about 60 m after which signal degradation means that digital video signals can no longer reliably be transmitted and displayed. With higher standard cables, e.g. CAT7 cables, the system can provide a useable range of approximately 70 m. Further, with greater drive signal strengths, lower cross talk connectors, CAT7 bulk cables with a greater wire diameter and/or lower video resolution, the system can work at distances of up to approximately 100 m. However, a 50 m extender product is a good target specification for a commercial product.

The transmitter 108 includes a DVI input port 120 by which a DVI output of the computer 102 can be connected by a conventional DVI cable 114. The transmitter also includes a USB port 122 by which a USB port of the computer can be connected by a conventional USB cable 116 to provide bi-directional USB signals to be sent between the computer 102 and transmitter 108. The transmitter 108 includes a digital video sub-system and a USB sub-system which operate largely independently.

The transmitter USB sub-system includes a USB device 124 providing extended USB connections for both USB 2.0 and USB 1.1. A suitable device is the LionsGate USB 2.0 Extension ASIC as provided by Icron Technologies Corporation. The USB device 124 is connected to a driver circuit 126 which includes differential line driver circuitry and circuitry to transmit and receive USB data in a multiplexed fashion over a twisted wire pair of the cable 112. The driver circuitry 126 is connected to a pair of pins of an RJ45 port 128 of the transmitter.

The transmitter digital video sub-system includes various circuitry for processing the DVI digital video signals received from the computer. The digital video sub-system includes a microprocessor unit 130 which generally controls operation of the transmitter and in particular the digital video sub-system. The transmitter microprocessor 130 is in communication with logic 132, in the form of an FPGA, which handles the majority of the processing of the digital video colour data. The digital video colour data processing logic 132 is in communication with the DVI input port 120 to receive DVI colour data and a timing reference signal or clock signal. The digital video colour data processing logic 132 is also in communication with pins of RJ45 output port 128 to output various signals for transmission over the other three of the twisted wire pairs of cable 112.

The transmitter microprocessor 130 is also in communication with a de-jitter circuit 136 which is also in bi-directional communication with logic 132.

The digital video subsystem further includes a memory device 138, in the form of an EEPROM, which stores various Extended Display Identification Data (EDID) data defining various graphics or display modes that may be supported by display devices (e.g. HDTV, SXGA, UXGA, WUXGA, WSXGA+). Memory device 138 is in communication with pins of the DVI input port 120 and the transmitter microprocessor 130. The transmitter microprocessor and memory device 138 co-operate to provide display mode information using a Display Data Channel (DDC) protocol to notify the computer 102 of the display modes that are supported by the extension system and which may be supported by the display device 104.

Various standard display modes are pre-loaded into EEPROM 138. The EDID data that is stored in EEPROM 138 contains a standard data structure that lists all the video modes and video timings that may be supported by the display device. The computer reads the EDID data over the DDC communications channel at power on or after the DVI cable has been connected. The computer then checks the desired video mode against the list of supported video modes in the EDID. If a match is found then this resolution is used. If a match is not found then the computer picks one of the supported resolutions.

The receiver 110 includes a DVI output port 140 by which a DVI input of the digital video display device 104 can be connected by a conventional DVI cable 142. The receiver also includes a group 144 of three USB ports by which various USB peripheral devices, such as a keyboard, mouse, etc., can be connected by conventional USB cables 146 to provide bi-directional USB signals to be sent between the peripheral devices and the receiver 110. The receiver 110 includes a digital video sub-system and a USB sub-system which operate largely independently.

The receiver USB sub-system includes a USB device 148 providing extended USB connections for both USB 2.0 and USB 1.1. A suitable device is the LionsGate USB 2.0 Extension ASIC as provided by Icron Technologies Corporation. The USB device 148 is connected to a USB hub, which in turn is connected to the three USB ports 150, and also to driver circuit 152 which includes differential line driver circuitry and circuitry to transmit and receive USB data in a multiplexed fashion over the twisted wire pair of the cable 112 which provides the auxiliary communications channel. The driver circuitry 152 is connected to pins of an RJ45 port 154 of the receiver.

Preferably the signalling speed of the USB system over the twisted pair cable is chosen to be the minimum possible to support the functionality required. This is so that the slew rate of the signals can be limited as much as possible.

Figure 18:
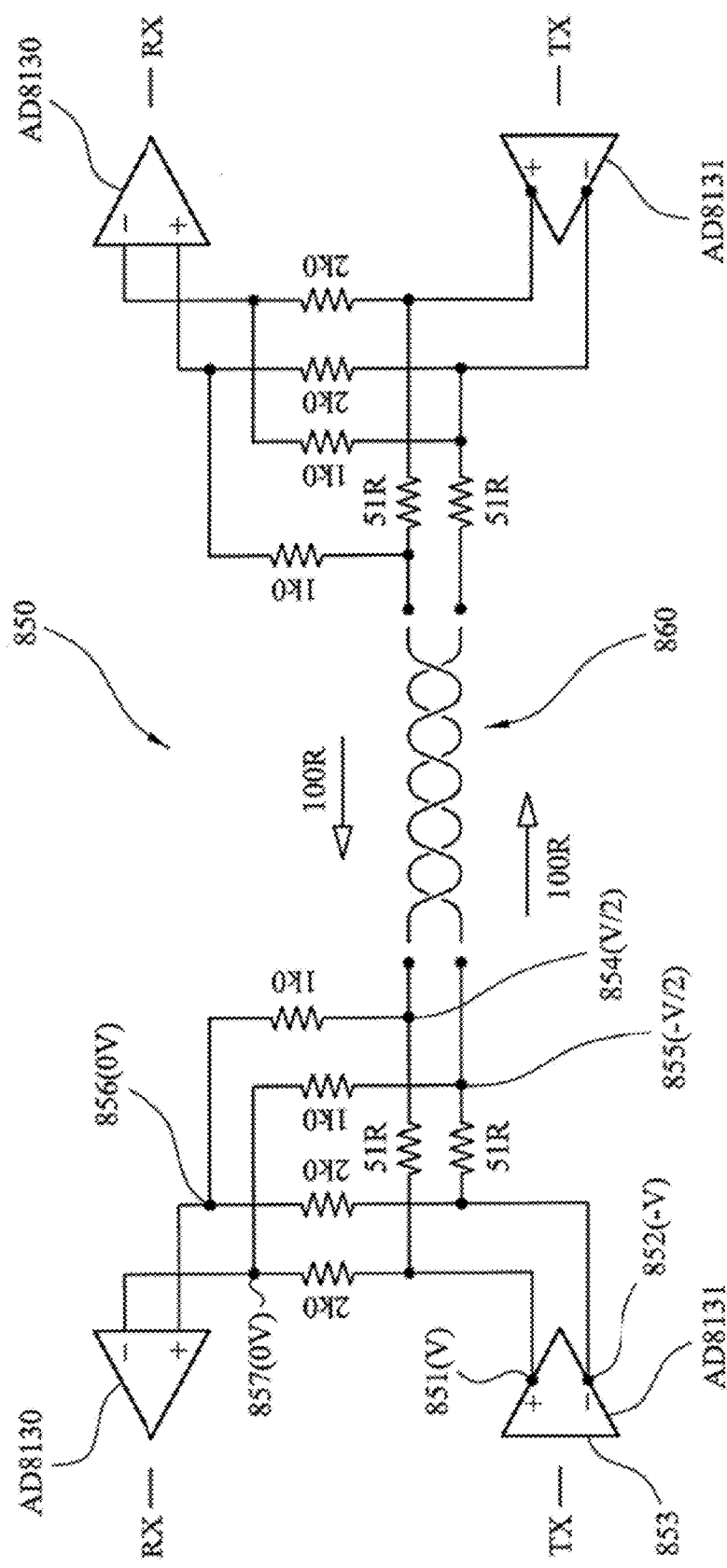
FIG. 18 shows a schematic block diagram of duplex driver circuit that can be used in the various systems of the invention.

Reducing the slew rate of the signals helps to increase the reach of the video sub-system as it reduces the crosstalk of the USB signals onto the video signals. A signalling rate of 12 Mb/s is preferred as this will support USB 1.1 and USB 2.0 low and full speed modes which is suitable for most keyboard and mouse devices that may typically be used with such equipment. A hybrid circuit (a version of which is illustrated in FIG. 18 and is discussed below) can be used that enables the twisted pair to be driven in both directions at the same time by implementing a telephone style technique to subtract the transmitted signal from the received signal. It is believed that this duplex arrangement helps to reduce the crosstalk associated with discontinuities that would otherwise occur during switching the direction of transmission of a half-duplex system that transmits in one direction at a time.

Hence, the USB sub-systems of the transmitter 108 and receiver 110, which operate largely independently of the digital video subsystems, provide a transparent USB connection between the peripheral devices and the computer 102 over the fourth twisted wire pair of cable 112 in which the computer and peripherals operate as though connected directly together.

As the auxiliary data and/or control signal channel operates largely independently of the three digital video signal channels, and operation of USB over a single twisted wire pair is generally understood by a person of ordinary skill in the art, operation of the auxiliary data/control signal channel will not further be described in detail below. However, as discussed below, the auxiliary channel does not need to be used exclusively to provide a USB communication link and can be used for other purposes depending on the application as discussed in relation to further uses of the invention below.

The receiver digital video sub-system includes various circuitry for processing the DVI digital video signals received from the transmitter 108 over the cable 112. The digital video sub-system includes a microprocessor unit 160 which generally controls operation of the receiver 110 and in particular the digital video sub-system. The receiver microprocessor 160 is in communication with receiver logic 162, in the form of an FPGA, which handles the majority of the processing of the transmitted digital video colour data. The digital video colour data processing logic 162 is in communication with an equalizer device 164 which in turn is in communication with pins of the RJ45 port 154 primarily to receive digital colour data over three of the twisted wire pairs of cable 112, but also other data transmitted to the receiver 110 by the transmitter 108. The equalizer 164 receives the signals on three of the twisted pairs, which for the DVI implementation will be either three video colour signals or timing 'prompt' signals as described elsewhere herein. For an HDMI implementation, the equalizer may also receive audio signals which are provided during the video sync time. The digital video colour data processing logic 162 is also in communication via a DVI buffer 334 with the DVI output port 140 to output the DVI colour data signals and also the reconstituted or recovered DVI timing reference signal. The buffer 334 also acts as a driver to output the DVI signals 142 from DVI port 140.

The receiver microprocessor 160 is also in communication with a de-jitter circuit 166 which is also in bi-directional communication with logic 162. The receiver microprocessor 160 is also in communication with a reference clock circuit 168 which is also in communication with receiver logic 162.

Figure 2:
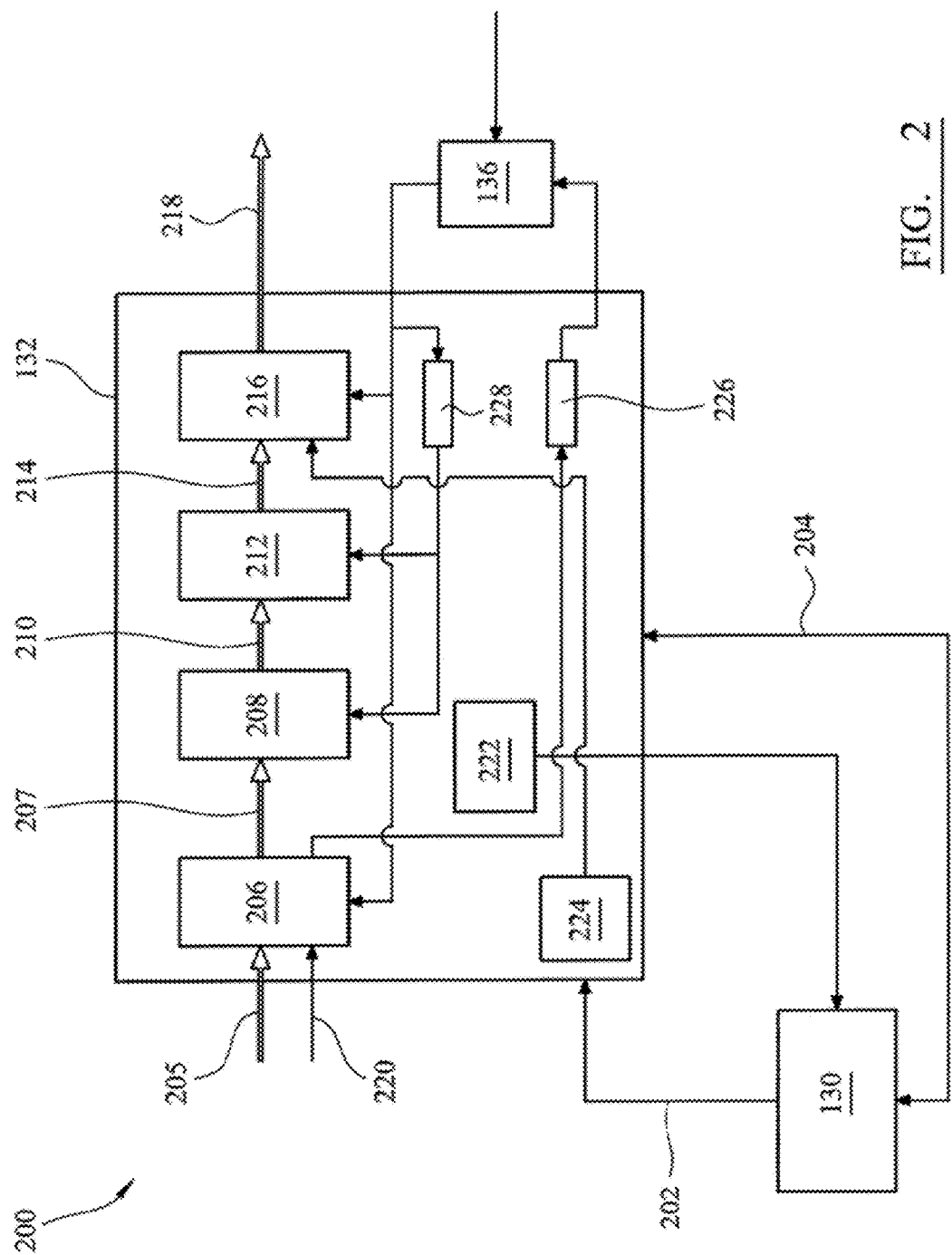
FIG. 2 shows a schematic block diagram of a video sub-system of the transmitter part of the system shown in FIG. 1 in greater detail and according to the invention.
Figure 3:
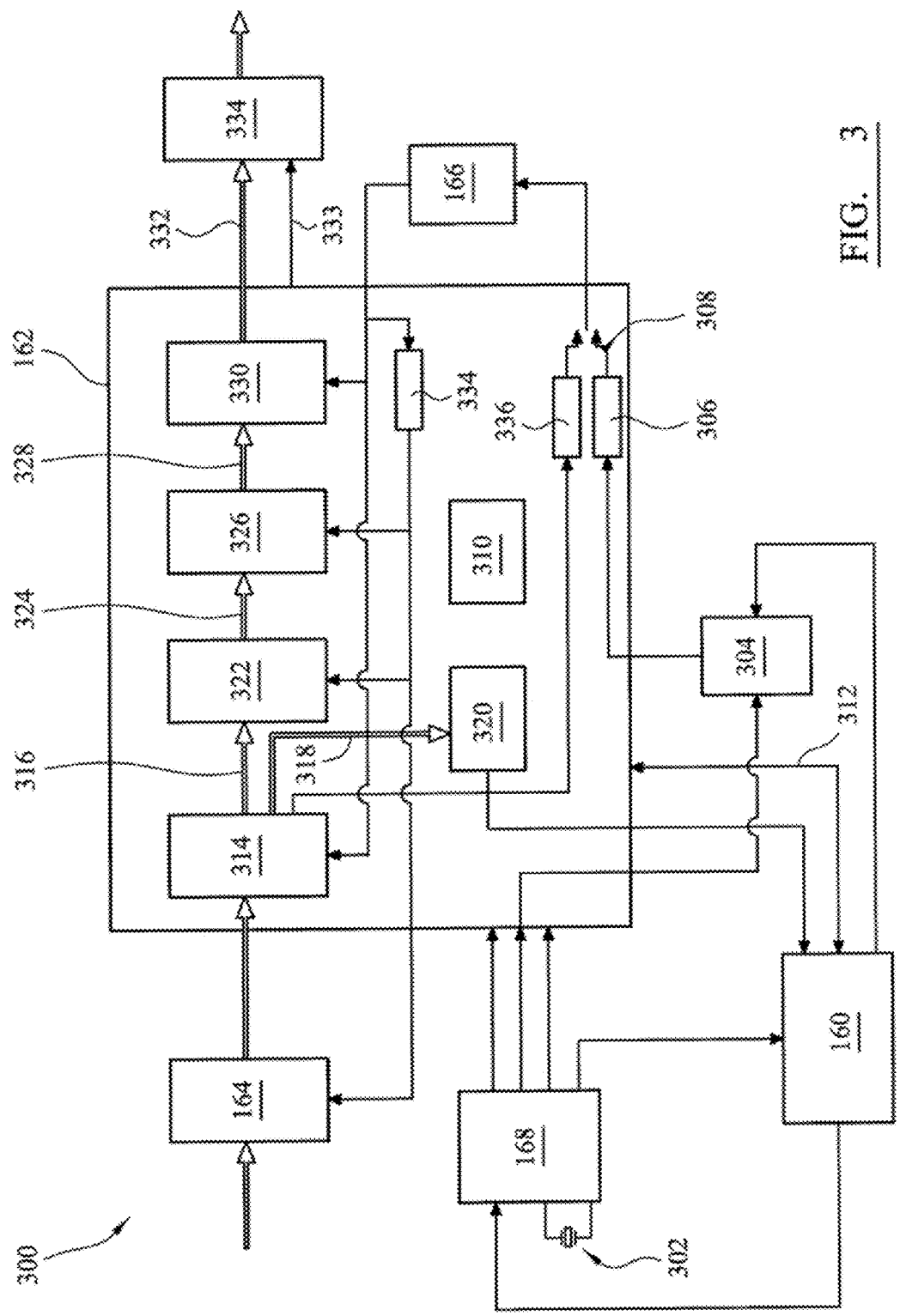
FIG. 3 shows a schematic block diagram of a video sub-system of the receiver part of the system shown in FIG. 1 in greater detail and according to the invention.

The digital video sub-system 200 of the transmitter and the digital video sub-system 300 of the receiver are shown in greater detail in FIGS. 2 and 3 respectively.

The transmitter digital video sub-system 200 is shown in FIG. 2 and includes microprocessor unit 130, digital video data processing logic 132 and de-jitter circuitry 136. Microprocessor 130 supplies a clock signal 202 to logic 132 and there is a control connection 204 between microprocessor 130 and logic 132. Logic 132 includes a first serializer-deserializer device (SERDES) 206 which receives TMDS encoded, serial red digital video data, green digital video data and blue digital video data 205 in 10 bit words, and outputs 10 red video data bits, 10 green video data bits and 10 blue video data bits in parallel. The parallel video data 207 is then processed by logic 208 which carries out a number of operations, including identifying data word boundaries for each colour, de-skewing the colour data, TMDS decoding and error detection. This results in parallel 8 data bits for each colour and with the inter-channel timing known. The parallel 8 data bits 210 are then processed by encoding logic 212 which carries out an 8b10b encoding to produce 10 parallel bits of data for each colour 214 and having an enhanced number of transitions. A second SERDES 216 (actually a deserializer-serializer) takes the input 10 parallel data bits for each colour, and outputs serialized 10 bit words 218 for each colour. The 10 bit words for each colour are then passed to a respective one of the three twisted wire pairs for transmission over the cable 112.

Figure 4:
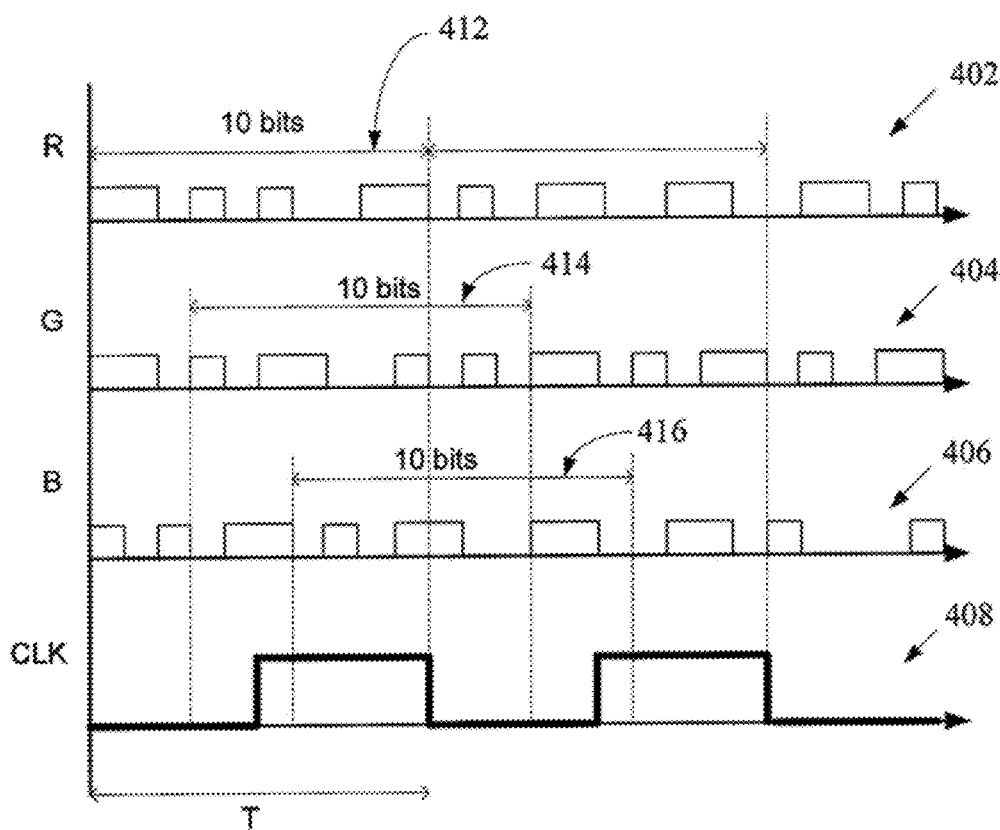
FIG. 4 shows a timing diagram illustrating the relationship between a pixel clock signal and digital colour data words.

SERDES logic 206 also receives as input a DVI clock signal 220 received from the computer 102. FIG. 4 shows a timing diagram illustrating the relationship between the DVI red 402, green 404 and blue 406 data and the DVI clock signal 408 output by computer 102 and received as inputs 205 and 220 to SERDES 206. DVI actually specifies that colour data for each pixel is specified by an 8 bit number (i.e. 0 to 255) for each of red, green and blue. However, that raw DVI colour data is then encoded using TMDS into 10 bit words and therefore the video card of computer 102 outputs DVI colour data as a serial stream of 10 bit words for each colour. Computer 102 also outputs a DVI clock signal 408, in which the period of the clock, T, is defined as the time between consecutive falling edges of the clock signal and which period corresponds to a 10 bit word.

Hence, as illustrated in FIG. 4, the first 10 bit word of the red signal has duration T seconds and is synchronous with the clock signal. The green and blue data signals also have 10 bit words, but the colour signals are not necessarily synchronous with the clock signal, nor with each other. As illustrated in FIG. 4, if each data word 410, 412, 414 is for the same image pixel, then the blue data word leads the green data word which leads the red data word. However, the timing offset is constant and so as long as the timing offset between the data words is known, then it is possible to correctly assign the colour data to each pixel. As also illustrated in FIG. 4, the clock period corresponds to 10 actual data bits, and therefore the pixel clock period is actually 10 times the bit period. As frequency is inversely proportional to period, the DVI data word frequency is ⅒th the bit frequency.

Logic 132 includes a frequency measurement component 222 in communication with an output of the first SERDES 206 (which does not de-serialize the DVI clock signal) and which counts the number of clock pulses of the DVI clock signal 220 over a period of time (e.g. 0.25 seconds) and calculates the frequency of the DVI clock signal 220. The frequency measurement component measures the frequency a number of times and passes the measured frequencies to the microprocessor unit 130 which calculates an average DVI clock frequency.

Logic 132 also includes various phase locked loops (PLLs) 224. A one of the phase lock loops receives an 8 MHz clock signal 202 from the microprocessor unit 130 and generates a stable 8 MHz reference clock signal and also outputs a 12 MHz reference clock signal 226 which is sent to SERDES 216. As described in greater detail below, during an initial phase of operation of the transmitter SERDES 216 outputs a 12 MHz reference clock signal to be transmitted to the receiver over a one of the colour channels of the cable.

The serial DVI clock signal is also communicated from SERDES 206 to the de-jitter device 136 so as to remove jitter from the DVI clock signal as a very stable DVI clock signal is required. Although sharp clock signal transitions are shown in FIG. 4, it will be appreciated that in practice the rising edge and falling edge transitions will be sloped somewhat which may produce undesirable timing jitter. Therefore, de-jitter device 136 is used to remove jitter from the DVI clock signal to allow a very accurate fixed value of the frequency of the DVI clock signal to be generated and supplied to both input SERDES 206 and output SERDES 216.

A 'divide by 8 or 4' 226 circuit and a 'divide by 2 or 1' circuit 228 are also provided and are largely artifacts of the de-jitter device which includes a 'multiply by 8' function and also which has to output a signal of around at least 50 MHz. For typical DVI signals the clock frequency will be at least 25 MHz. Therefore, for DVI clock signals having a frequency less than 50 MHz, the 'divide by 4' function is used, the frequency is then increased by a factor of 8 by the de-jitter device and then the 'divide by 2' function is used to restore the original frequency. If the DVI clock signal has a frequency above 50 MHz, then the 'divide by 8' function is used, the frequency is then increased by a factor of 8 by the de-jitter device to its original value and so the 'divide by 1' function is used to retain the original frequency. Both the SERDES blocks 206 and 216 internally can handle either a 'word rate' clock signal or a 'twice word rate' clock signal so the settings of the blocks are different for the 'below 50 MHz' situation. Hence, in some circumstances, the 'divide by 2' operation may need to be applied to the clock signal being sent to 208 and 212, but not to the clock signal being sent to the SERDES blocks 206, 216.

The receiver digital video sub-system 300 is shown in FIG. 2 and includes microprocessor unit 160, digital video data processing logic 162, equalizer 164, de-jitter circuitry 166 and programmable clock 168.

Equalizer 164 receives 8b10b encoded red green and blue video data signals from the three video channels of the cable provided by the three twisted wire pairs and applies frequency dependent amplification to the incoming signals to counteract the frequency dependent signal degradation of the transmitted signals. Equalization of signals transmitted over twisted pairs for signal recovery is generally known in the art. A suitable device for equalizer 164 is the MAX3815 TMDS Digital Video Equalizer provided by Maxim Integrated Products Inc., of California, USA.

Programmable clock 168 is connected to microprocessor unit 160 by an inter integrated circuit (i2c) bus. Programmable clock 168 includes a 24 MHz oscillator 302 and is programmable to synthesise a number of clock signals with desired frequencies. A first synthesised clock signal is supplied to a programmable frequency multiplier device 304, which is also a de-jitter device, and which is controlled by the microprocessor unit 160. The output of the programmable frequency multiplier device is passed via a 'divide by 8' circuit 306 to the input of de-jitter device 166 via a switch 308. The net effect of the 'divide by 8' circuit 306 and the ×8 factor of the de-jitter device 166 is that there is no gain in the frequency of de-jittered signal output by de-jitter device 166.

Other synthesised clock signals are passed to phase locked loop logic 310 used by the de-jitter devices and also by the programmable clock to provide control stability.

There is a control connection 312 between microprocessor 160 and logic 162. Logic 162 includes a first serializer-deserializer device (SERDES) 314 which receives 8b10b encoded, serial red digital video data, green digital video data and blue digital video data in 10 bit words, from the equalizer 164, and outputs 10 red video data bits, 10 green video data bits and 10 blue video data bits in parallel 316. The first SERDES 314 is also connected to a frequency decoding device 320. During an initialization phase, clock information may be transmitted over the cable and SERDES 314 passes the clock information signal 318 to the frequency decoder 320, which is connected to the microprocessor unit 160 and which can issue a signal to the microprocessor indicative of the DVI clock frequency.

The parallel video data 316 is then processed by logic 322 which carries out a number of operations, including identifying data word boundaries for each colour, de-skewing the colour data, 8b10b decoding and error detection. This results in parallel 8 data bits for each colour and with the inter-channel timing known. The parallel 8 data bits 324 are then processed by encoding logic 326 which carries out TMDS encoding to produce 10 parallel bits of data for each colour 328 encoded using standard DVI TMDS. A second SERDES 330 (actually a deserializer-serializer) takes the input 10 parallel data bits for each colour, and outputs serialized 10 bit words 332 for each colour as used by DVI. The 10 bit words for each colour are then passed to a DVI data buffer 334.

The output of de-jitter circuit 166 is connected to an input of SERDES 314 and SERDES 330 to supply a clock signal either derived from the transmitted DVI clock information or a recovered or reconstituted clock signal once a video display mode has been locked to. The de-jittered clock signal output by de-jitter circuit 166 is also supplied, via a 'divide by 2/1' circuit 334 to respective inputs of the equalizer 164, logic 322 and TMDS encoder 326. An output of SERDES 314 is also connected to de-jitter circuit 166 via a 'divide by 8/4' circuit, the purpose of which and 'divide by 2/1' circuit 334 is similar to the corresponding circuits for transmitter logic 132, to provide a recovered or reconstituted clock signal derived from the received colour data.

Similarly to as described above, both the SERDES blocks 314 and 330 internally can handle either a 'word rate' clock signal or a 'twice word rate' clock signal so the settings of the blocks are different for the 'below 50 MHz' situation. Hence, in some circumstances, the 'divide by 2' operation may need to be applied to the clock signal being sent to 164, 322 and 326, but not to the clock signal being sent to the SERDES blocks 314, 330.

Figure 5:
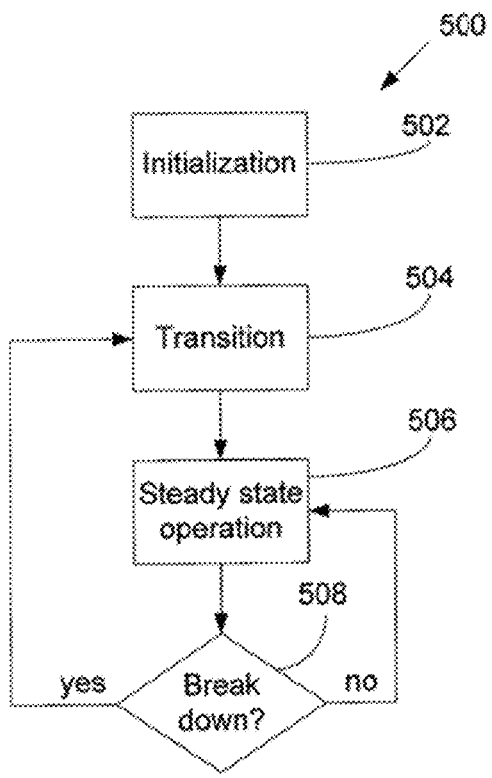
FIG. 5 shows a high level flow chart illustrating various phases of operation of the system shown in FIG. 1.

Operation of the transmitter and receiver shown in FIGS. 2 and 3 will now be described in greater detail with reference to the data processing flow charts illustrated in FIG. 5 to N. As illustrated in FIG. 5, the method of operation 500 of the DVI extender has three general states: an initialization state 502, in which the transmitter and receiver carry out various initialization processes; a transitory state 504, in which the extender tries to lock to a particular display mode; and a steady operating state 506 in which the extender simply transmits and outputs the DVI video signal. If a break down in the steady operating state is determined 508, e.g. because of noise on the cable or because too many errors are detected or because a display mode changes, then the extender may return to the transitory state in which it tries to lock to the display mode for the transmitted video colour so as to re-establish the reliable display of video.

Figure 6:
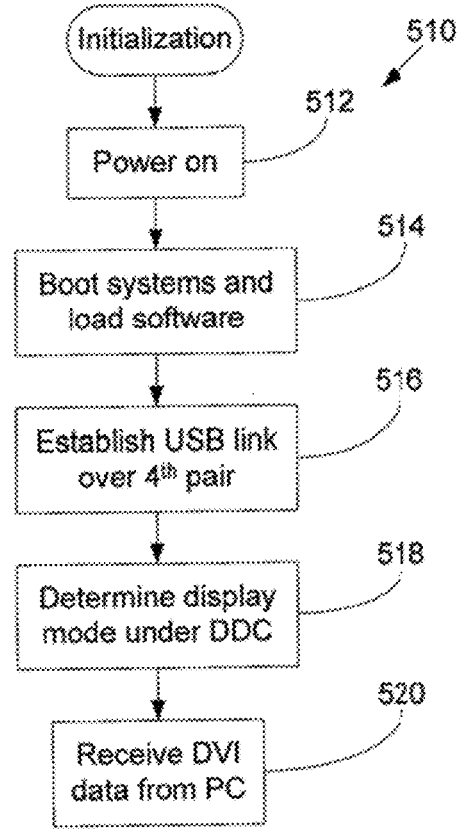
FIG. 6 shows a flow chart illustrating the initialization phase of operation of FIG. 5.

FIG. 6 shows a data processing flow chart illustrating initialization operations 510 carried out in the initialization stage 502 in greater detail. Firstly, the transmitter and receivers are powered on at 512 and at 514 the electrical circuitry boots up and any control software used by the microprocessor or other components is loaded into memory. At 516, the USB controllers 124, 148 start to communicate with the attached computer and the peripheral devices and each other to establish a transparent USB communication channel over the fourth twisted wire pair of cable 112. Although shown sequentially in FIG. 6, it will be appreciated that this can occur in parallel with the other operations illustrated in FIG. 6. At 518, a display mode to be used for displaying video is determined.

As discussed briefly above, DVI is simply an interface which can be used to provide video signals for display devices operating over a wide range of display modes. Each display mode is typically characterised by its resolution and a screen refresh rate frequency. For example, the UXGA standard specifies 1,600×1,200 pixels, while SXGA specifies 1,280×1,024. Hence, depending on the display mode being used, the required data transfer rate will vary and also the pixel clock time period and hence frequency will vary. This is why conventionally, as DVI and HDMI are not packet based and simply stream non-compressed colour data, a clock signal also needs to be transmitted with the colour data as the receiver does not know in advance what display mode is going to be used and therefore what clock frequency is needed. The DVI clock frequency can be anywhere between 25 MHz to 165 MHz and its actual frequency needs to be known to a high degree of accuracy in order to reliably reconstitute the video image from the transmitted colour data.

At 518, the computer 102 accesses EEPROM 138 and reads the stored EDID data over the DVI cable 114 under DDC. The computer video card determines which of the display modes represented by the EDID data it can support and one of the supported display modes is selected. The video card of computer 102 then starts to output DVI video data (TMDS encoded colour signals 205 and a DVI clock signal 220) for the selected display mode which is received by the transmitter at step 520.

In an alternate embodiment, in which the transmitter and receiver microprocessors are in communication via the auxiliary data channel, the transmitter signals to the receiver to query the attached monitor to see what EDID data it stores and hence what display modes it can support or prefers. The EDID data stored on the monitor is then transmitted from the receiver to the transmitter over the auxiliary data channel and is then written to EEPROM 138 by microprocessor 130. The computer can then determine the display modes, or the preferred display mode, supported by the monitor and output DVI data for a selected or the preferred display mode.

Figure 7:
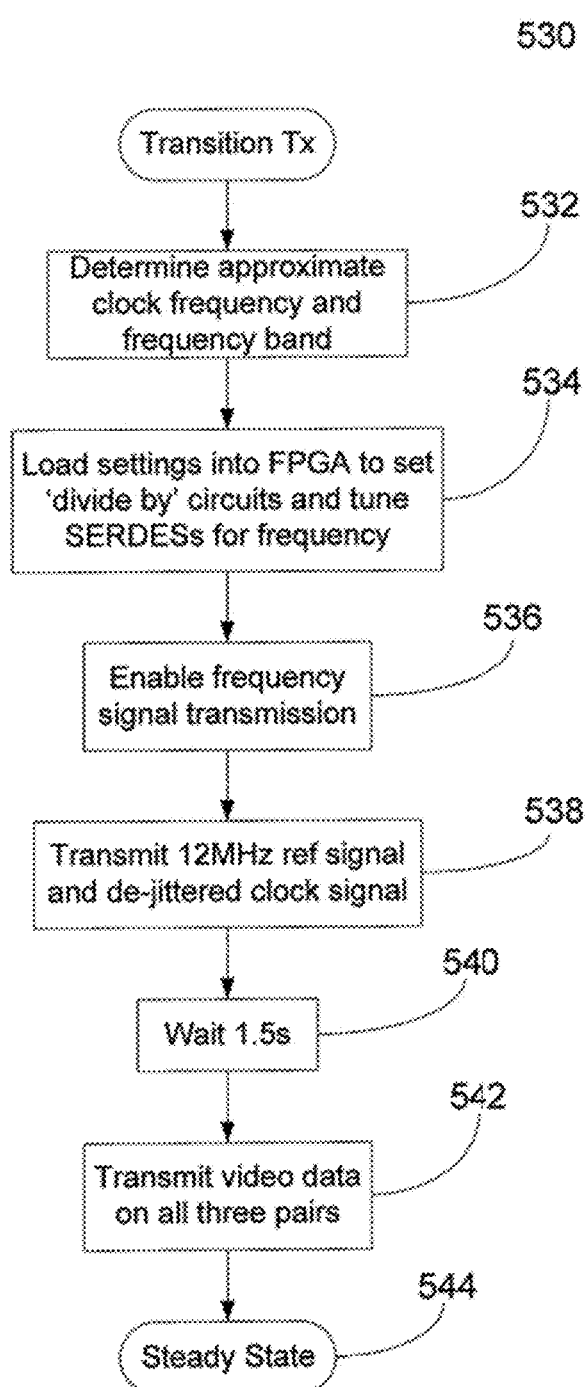
FIG. 7 shows a flow chart illustrating operations carried out by the transmitter during the transitional phase of operation and passing into steady state operation.
Figure 8:
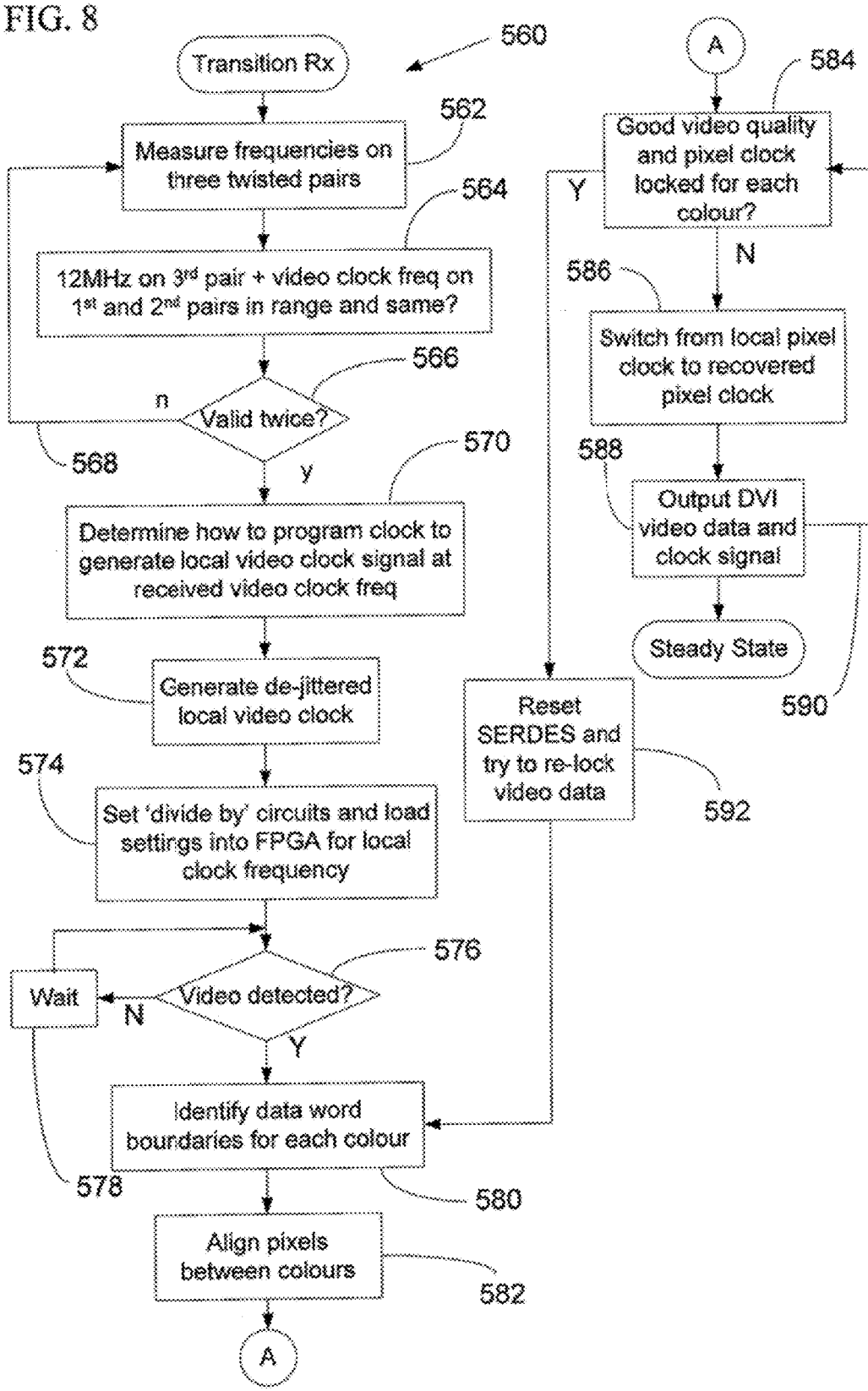
FIG. 8 shows a flow chart illustrating operations carried out by the receiver during the transitional phase of operation and passing into steady state operation.

After initialization, the transmitter and receiver enter a transitional state of operation 504 during which information about the video clock signal is sent from the transmitter to the receiver over the cable so that the receiver can use the information about the video clock signal to process the subsequently received video colour data and reconstitute the DVI signal for output to the display device. FIG. 7 shows a process flow chart illustrating a method of operation 530 of the transmitter (Tx) video sub-system 200 and FIG. 8 shows a process flow chart illustrating a method of operation 560 of the receiver (Rx) video sub-system 300.

As discussed above the first SERDES 206 receives the DVI colour signals 205 and the DVI clock signal 220 output from the computer. The red colour signal includes a blanking word or character at the end of each display line, as does the green colour signal, and the blue colour signal includes a horizontal synchronisation word or character and also a vertical synchronisation word or character. SERDES 206 passes the DVI clock signal straight through and the frequency measurement circuit 222 measures the approximate frequency of the DVI clock signal by counting the number of pulses over a given time period. This then determines the approximate clock signal frequency and this is then read by microprocessor 130. The DVI clock signal falls within the range of 25 MHz to 165 MHz. The microprocessor assigns six frequency bands to the possible range of DVI clock frequencies and determines into which of those six bands the measured DVI clock frequency falls. Hence, at 532, an approximate value for the DVI clock frequency has been determined and a corresponding frequency band identified.

For the determined frequency band, the microprocessor 130 looks up various settings data for the 'divide by' circuits 226, 228 and also for SERDES 206 and SERDES 216 so as to optimise their performance at the approximate DVI clock frequency and loads settings 534 into the FPGA 132 to configure performance of the FPGA for this DVI clock frequency.

Meanwhile, the DVI clock signal is also supplied to the de-jitter device 136 to remove jitter from the DVI clock signal to provide a more accurate clock signal which is passed to SERDES 216. Microprocessor 130 supplies a control signal 202 to cause phase locked loop circuitry 224 to generate a reference signal at 12 MHz and which is also passed to SERDES 216. The microprocessor 130 enables the FPGA to transmit the de-jittered clock signal and also the 12 MHz reference signal at step 536. Then at 538, the de-jittered clock signal is transmitted over both the first twisted pair and the second twisted pair of the cable and the 12 MHz reference signal is transmitted over the third twisted pair. The transmitter video sub-system 200 then waits for 1.5 seconds at 540.

With reference to FIG. 8, the receiver video sub-system 300 receives the two DVI clock signals sent over the first and second twisted pair and also the 12 MHz reference signal sent over the third twisted pair. The two clock signals and the reference signal are passed by SERDES 314 to the frequency prompt decoder which measures the frequencies 562 of the three separate signals, by counting the number of pulses over a certain time period every 0.25 s. The frequency prompt decoder passes the three measured frequencies to the microprocessor 160 which determines at 564 if a 12 MHz signal has been received on the third twisted pair and a frequency within the video clock range (25 MHz to 165 MHz) has been received on both the first twisted pair and the second twisted pair and if the frequencies of the signals on the first twisted pair and second twisted pair are sufficiently the same (within about 100 to 200 ppm). As the signal on the third twisted pair is outside of the DVI clock range this can be taken as a signal telling the receiver that it is receiving information about the DVI clock from the transmitter and that it is not currently receiving video data from the transmitter. The signals on the first and second twisted pairs provide information about the DVI clock (a rough approximation) at the transmitter but are not a perfect or close enough reproduction of the DVI clock signal at the transmitter as they are accurate to maybe a hundred parts per million whereas the DVI clock signal needed to reproduce the video data needs to be accurate to within parts per million.

Checking that the signals on the first and second twisted pairs fall within the DVI clock signal range provides confidence at the receiver that the measured signals correspond to the transmitted clock signals. Further, checking that the signals have a sufficiently similar frequency provides confidence at the receiver that the same clock signal has been measured on each of the first and second twisted wire pairs and not simply a signal in the correct range, e.g. a harmonic.

If the condition of step 564 is found to be valid, then the microprocessor increments a count by one and at step 566 determines whether the condition has been found to be valid twice consecutively. If not, then processing returns 568 to step 562 and the frequencies of the signals on the three twisted pairs are measure again. If the condition of step 564 is not found to be valid by the microprocessor, then the count is reset to zero. When the condition has been found to be valid on two consecutive occasions, then the receiver can be confident that it has received information about the DVI clock frequency by the transmitter and also now has a measured approximate value of the frequency of the DVI clock signal.

Alternative approaches to providing information about the DVI clock signal from the transmitter to the receiver would be to measure the DVI clock signal (or a de-jittered value thereof) at the transmitter, e.g. using frequency measurement circuit 222, and then transmit the measured frequency value over either the auxiliary data channel (fourth twisted pair) or over one or more of the first to third twisted wire pairs. Although this approach works for some embodiments it is not preferred.

Firstly, if sent over the auxiliary channel, then this would require interruption of the normal control and/or data signals already being sent over the auxiliary channel.

Secondly, it is better to use a local clock at the receiver to measure the frequency of the transmitted clock signal rather than using a local clock at the receiver to measure the frequency, sending the frequency information, and then using a local clock at the receiver to regenerate a signal with the measured frequency. This is because the local clocks at the transmitter and receiver will typically not have sufficient accuracy and so one second measured by the transmitter local clock will not be sufficiently the same as one second measured by the receiver local clock as the accuracy of the local clocks may only be good to 100 ppm rather than the 1 ppm accuracy required of the DVI clock signal. However, for lower frequencies this approach may be practicable.

Then at 570, the microprocessor determines how to program the clock synthesizer circuit 168 to output a clock signal at the frequency of the approximation of the DVI clock frequency. Hence, the microprocessor 160 sends control signals to clock synthesizer circuit and also to programmable de-jitter circuit 304, which includes a programmable frequency multiplier functionality, to generate 572 a de-jittered clock signal which is local to the receiver circuit and at the measured frequency and which is a reasonable approximation of the frequency of the actual DVI clock signal to within a few 10s of ppm. The microprocessor 160 determines what multiplier to instruct the programmable frequency multiplier 304 to use to try and arrive at a local pixel clock frequency as close to the measured value of the frequency of the transmitted clock signal. The local clock signal based on the transmitted clock signal information is then passed via 'divide by 8' circuit 306 to de-jitter circuit 166 and on to SERDES 330 and SERDES 314 and also equalizer 164, logic 322 and TMDS encoder 326.

Microprocessor 160 now knows the approximate frequency of the DVI clock signal and so at 574 it sets the 'divide by' circuits and loads settings into the FPGA to set up the SERDES to improve their performance around the clock frequency. At 576 the microprocessor 160 determines whether a video signal is being received or not by determining whether a 12 MHz signal is still being measured by the frequency prompt decoder 320. If no video signal is detected at 576, the process waits at 578 before determining again whether video reception has been detected or not. This loop will continue until the 1.5 s wait 540 of the transmitter expires and the transmitter stops sending the 12 MHz reference and clock signals and starts to send video data.

Returning briefly to FIG. 7, at 542, the transmitter sends the DVI red video data on the first twisted wire pair, the DVI green video data on the second twisted wire pair and the DVI blue video data on the third twisted wire pair. The transmitter then effectively enters the steady state 506 in which it is transmitting video data 542 to the receiver. However, the transmitter carries out processing of the DVI video data to change its format into a format more suitable for recovery of the video data after degradation by transmission over reasonably long distances.

Figure 9:
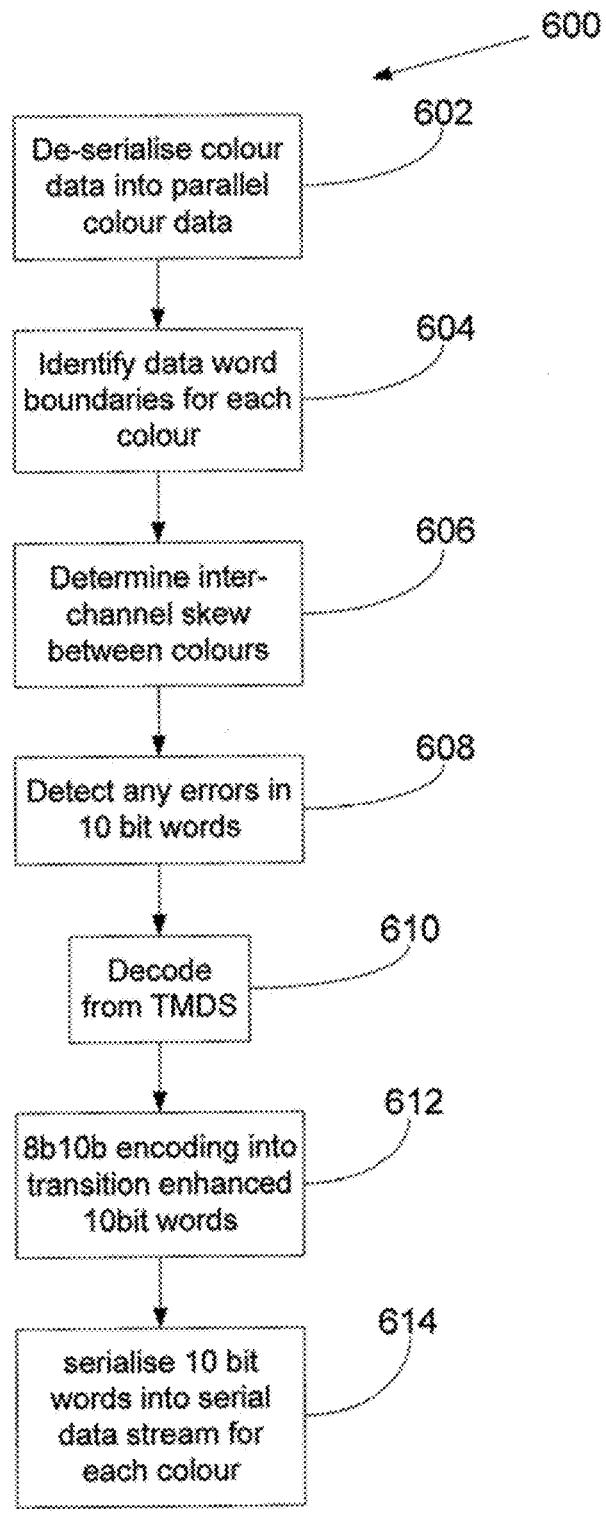
FIG. 9 shows a flow chart illustrating operations carried out by the transmitter during operation.

FIG. 9 shows a process flow chart illustrating the video data processing operations 600 carried out by the input SERDES 206, logic 208, 8b10b encoder 212 and output SERDES 216. At 602 input SERDES takes the three DVI colour serial data streams and converts them into three sets of parallel video data bits, one set of parallel video data for each colour. Then at step 604 logic 208 processes the parallel video data to try and identify data word boundaries, so as to determine which consecutive sequences of 10 data bits correspond to an individual pixel. This process is carried out independently for each colour and the process is illustrated in more detail by the flow chart in FIG. 10.

Figure 10:
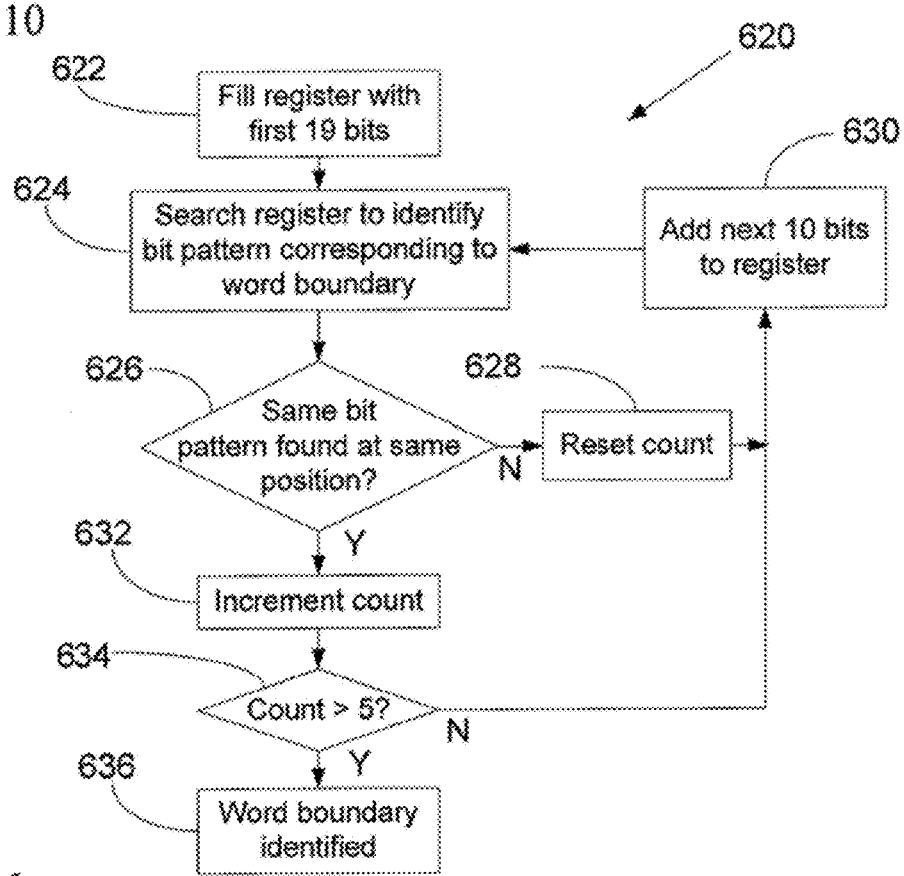
FIG. 10 shows a flow chart illustrating a data word boundary identification part of the method shown in FIG. 9.
Figure 11:
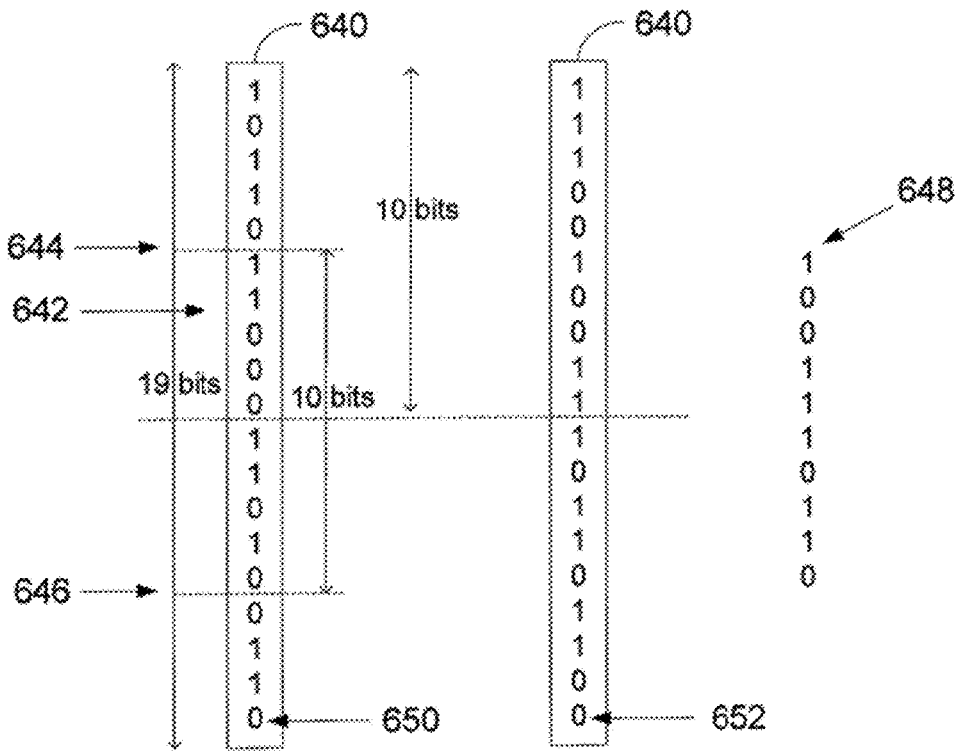
FIG. 11 shows a schematic representation of parallel data bits in a register being searched for control data bit patterns as part of the method of FIG. 10.

FIG. 10 shows a process flow chart illustrating a method 620 for identifying data word boundaries and FIG. 11 shows a schematic representation of a register 640 of the FPGA storing video data bits in parallel and being processed by the method. At the start of the method a 19 bit register of the FPGA 640 is filled 622 with the next 19 bits of video data. At this stage the boundaries between the 10 bit long data words of the video data are not known. As the register 640 is 19 bits long it will store not more than one whole 10 bit data word, e.g. data word 642 corresponding to a particular pixel, however the boundaries of that word 644, 646 are not yet known. A bit pattern corresponding to a synchronization data word, rather than potentially video data, is searched for in the bits in the register to try and identify inter-word boundaries. In both TMDS and 8b10b encoding, some bit patterns are reserved for control data rather than simply data. There are four different bit patterns which can each be used to represent the end of line synchronization signal. For example the 10 bit, bit pattern 648 is a one of the reserved synchronization bit patterns, rather than a video data bit pattern.

Hence, at step 624, the 19 bits 650 currently present in the register 640 are searched to see if bit pattern 648 is present or not. As bit pattern 648 is not present in bits 650, the control bit pattern is determined not to be present at 626 and a count is re-set to zero at 628. Then at 630, the next ten bits of video data are placed in the top ten positions of register 640, the bits previously present in the top nine bits are copied to the last nine bits and the previous last ten bits are discarded (as they have already been considered by the previous step 624). Then step 624 is repeated for the updated, current 19 bits 652 and the bits are searched to see if a bit pattern corresponding to control bit pattern 648 is present or not. As can be seen, the 6th to 15th bits in the register 652 correspond to bit pattern 648 and so the data word boundary positions 644, 646 may have been identified. The potential position of the data word boundary in the register 640 is stored. As the data word length is fixed at 10 bits the position of only a one of the boundaries needs to be known and stored and the other boundary can be derived therefrom.

However, it is possible that there are errors in the video data in the register and the identification may have been a false positive. Hence, the method 620 determines whether the same control bit pattern is identified at the same position in the register a plurality of consecutive times in order to reliably have identified the data word boundary. A count is incremented 632 and compared with a threshold value, in this example five, to see if the same bit pattern has been identified in the same position in the register 6 times consecutively or not. If not then processing returns to step 630 and the register 640 is updated with the next ten bits of video data. Processing continues to loop as described above. If the control bit pattern is not identified in the register, as all the bits correspond to video colour data, then no action is taken with regard to the counter and the next ten bits are simply loaded and searched. If the control bit pattern is identified again, but in a different position in the register, then this may be because the end and beginning bits of two adjacent video colour data words coincidentally have the same bit pattern as the control bit pattern and so may be a false positive. Hence, if the same bit pattern is identified but at a different position in the register, then the count is re-set to zero and the new potential data word boundary position is stored. However it is not possible to discriminate between false positives individually, so instead the method looks for the existence of the same control bit pattern at the same position at least six times in order to be confident that this is the actual inter-word boundary and not a false positive. Hence, once the same control bit pattern has been identified at the same position a plurality of consecutive times, the data word boundary position has been identified and is stored at 636.

Process 620 is carried out for each colour independently and so the data word boundary is determined for each video data stream separately. SERDES 206 uses the input de-jittered pixel clock signal as a reference clock for performing the de-serialization. The lower the jitter in the reference clock signal the better the performance when the input signals are of poor quality, which is particularly the case for SERDES 314 in the receiver circuitry 300. Hence, the groups of 10 bits each corresponding to a single pixel are now known. However, the relationship between the red, green and blue data for the same pixel is not yet known.

Figure 12:
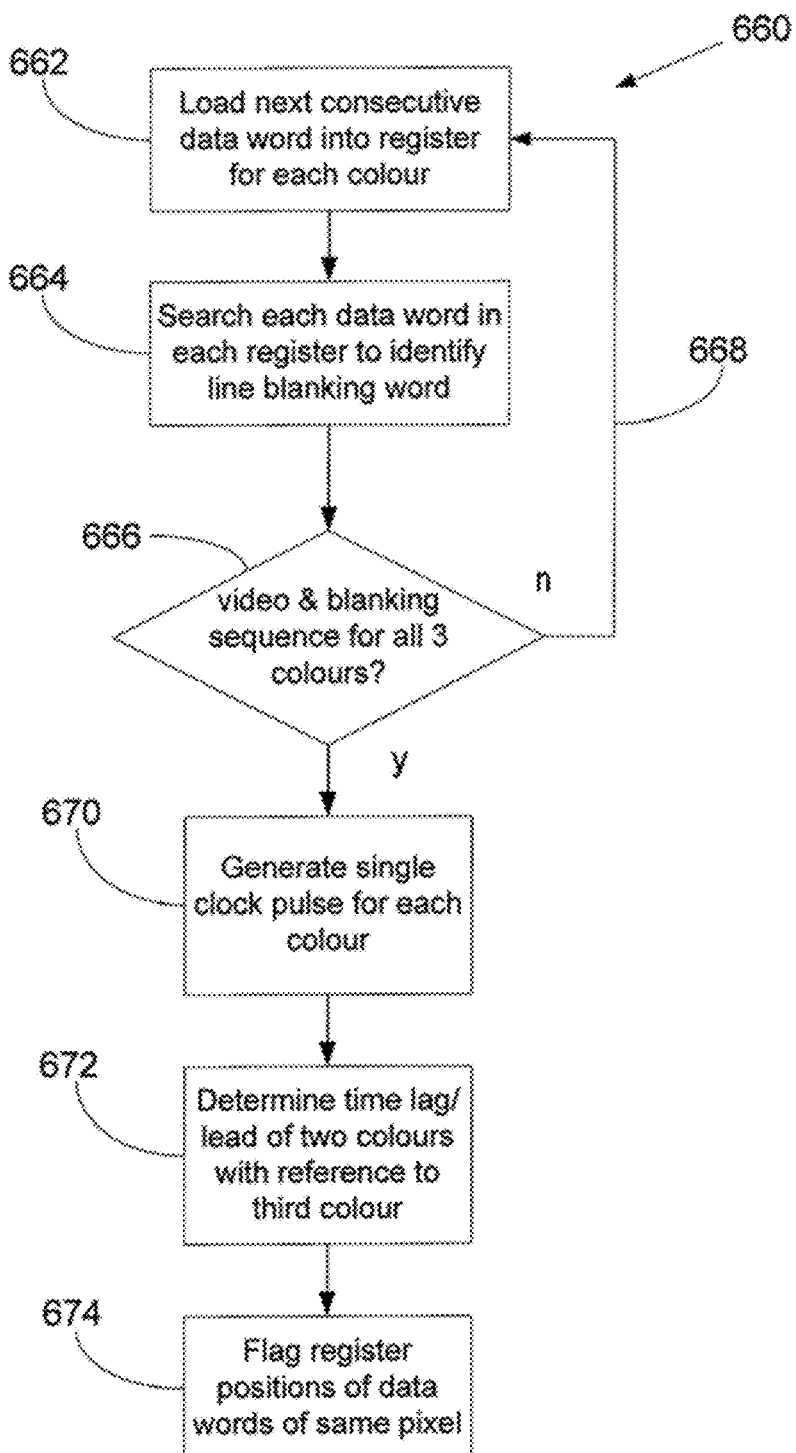
FIG. 12 shows a flow chart illustrating an inter-channel data word alignment part of the method shown in FIG. 9.
Figure 13:
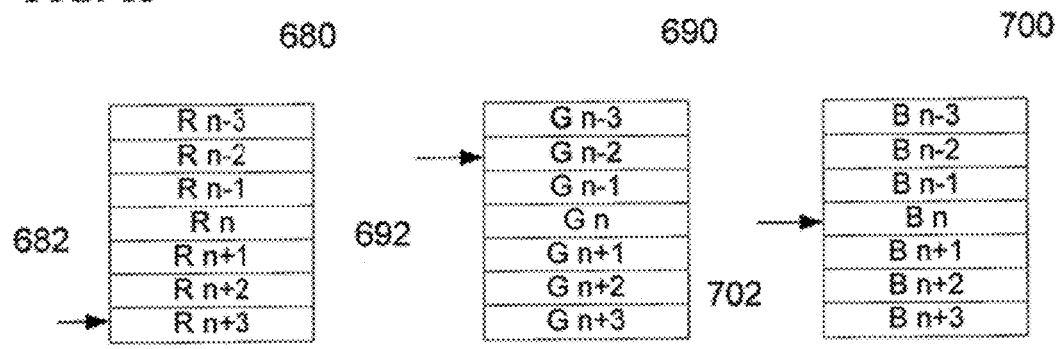
FIG. 13 shows a schematic representation of parallel data bits in three registers being searched for control data words as part of the method of FIG. 12.
Figure 14:
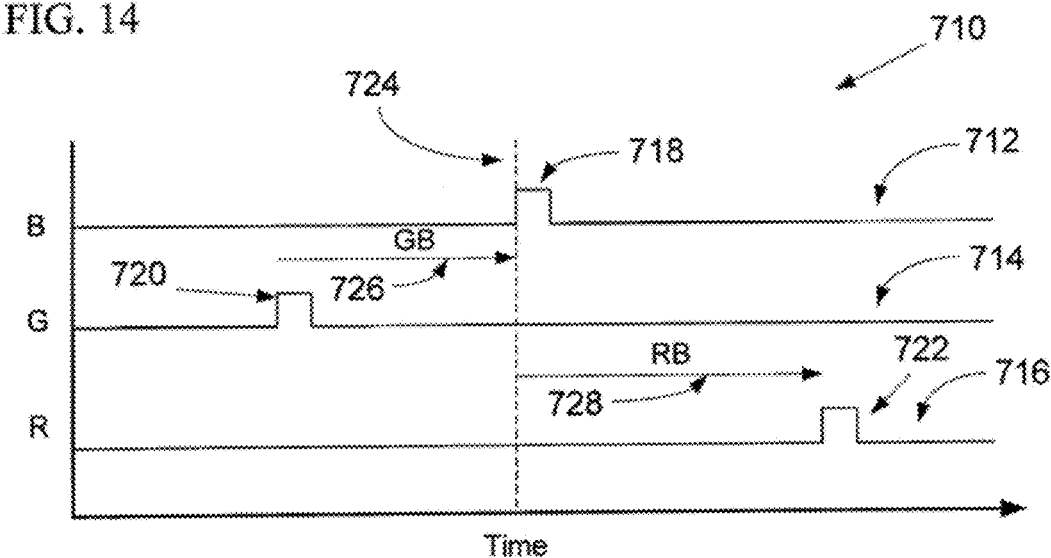
FIG. 14 shows a timing diagram illustrating the relative timing differences between data words for the same pixel

Returning to FIG. 9, the next stage in the processing of the video data is to determine 606 the timing differences between the red, green and blue pixel data so that the colour data for the same pixel can be identified. The process for determining the timing differences between the three colour channels is illustrated by the flow chart of FIG. 12. FIG. 13 shows three seven data word registers, one for each colour and FIG. 14 shows a graphical representation of the timing relationship between the three colour pixel data word data stored in the registers of FIG. 13.

As illustrated in FIG. 13, FPGA 132 includes three 10 bit word wide, seven entry registers, with one register assigned to each colour 680, 690, 700 for red, green and blue respectively. Hence, each register 680, 690, 700 can store seven consecutive 10 bit data words for its colour. Although seven consecutive words are shown in FIG. 13 for simplicity of explanation, in practice each register can store 16 consecutive data words, allowing skew alignments of up to +7/−8 pixels on the green and red channels, relative to the blue channel, to be corrected. At this stage of processing it is not yet known which pixel each data word is for. That is the red data word in the nth register position will be for one pixel, but the blue data word in the nth register position may be for a different pixel and the green data word in the nth register position may be for a different pixel to both the blue and red data words. Method 660 looks for line blanking data (present at the end of each line of pixels of the image) in order to identify the ends of lines of pixels of each colour and hence to determine the timing differences between the red, green and blue data words.

Initially seven consecutive data words, corresponding to seven consecutive pixels of a line of an image, for each colour are loaded 662 into their respective registers 680, 690, 700. Then at 664, the data words for each colour are searched to see if any of the data words correspond to a control data word (rather than colour data) for the end of line blanking signal. If line blanking data words are not identified at 666 then processing returns 668 to 662 and for each colour a next data word is loaded into the top of the register and the last data word is popped off the bottom of the register. If line blanking data words are identified then a count of consecutive line blanking data words is updated.

If a specific sequence of data words and blanking interval data words is identified, then a single timing signal pulse is generated 670 corresponding to the location of each blanking data word using the clock signal input to logic 208. More specifically, a timing pulse is generated if a sequence of 12 'colour' data words followed by 12 'control' data words is identified. This situation should only occur at the transition from video picture data to blanking data.

FIG. 14 shows a timing signal diagram 710, illustrating a timing signal 712 for blue data, a timing signal 714 for green data and a timing signal 716 for red data. For example, as illustrated in FIGS. 13 and 14, if the red data word in register position n+3 and the green data word in register position −2 and the blue data word in register position n all correspond to a blanking data word then a pulse 722 is generated first in the red timing signal (as position n+3 is earlier in time), then a pulse 718 is generated in the blue timing signal 712 (as position n is later in time than position n+3 and finally a pulse 720 is generated in the green timing signal 714 (as position −2 is later in time than position n).

A one of the colours is then selected as a reference colour, in this case blue, and the time lag or lead between the blue pulse 718 and the green pulse 720 and the red pulse 722 is determined at 672. In the illustrated example, taking the rising edge of the blue pulse 724 as the reference time, the red pulse leads the blue pulse by time RB 728 and green pulse 720 lags the blue pulse 718 by time GB 726. From the time delays, and knowing the length in time of a 10 bit data word, it is possible to determine the off set in terms of data words between the green data and the blue data (from GB 726) and the off set between the blue data and the red data (from RB 728). In the illustrated example, green data words lag blue data words by two data words and red data words lead blue data words by three data words. Hence, at step 674, the off set in data words between the blue, green and red data words is flagged in the registers. For example, flag 702 is the reference register position for the blue data (register position n), flag 682 is the register position for the red data (register position n+3) and flag 692 is the register position for the green data (register position n−2). Hence, for a particular pixel, its blue colour data can be read from position n of the blue register 700, its red colour data from position n+3 of the red register 680 and its green colour data from position n−2 of the green register 690. Hence, the data words corresponding to the same pixel have now been identified.

Returning to FIG. 9, at 608 the error detection is carried out on the 10 bit TMDS data words. TMDS encoding reserves certain 10 bit words as being acceptable data or control words to be sent in order to maintain DC balance within the constraints of the TMDS encoding typically used by DVI. Some 10 bit combinations are not acceptable for TMDS encoding and hence if a 10 bit data word is detected having a bit pattern not corresponding to the acceptable TMDS bit patterns, then that bit pattern can be considered an error. Hence, during error detection step 608, FPGA detects any bit patterns not corresponding to allowable bit patterns and maintains a count of error bit patterns. If the error rate exceeds a threshold value then this may indicate an incorrect locking to the word boundaries or to the colour off sets or some other problem with operation of the transmitter and so the microprocessor may try and re-start operation to try and lock the video signal again.

At 610, the TMDS encoded 10 bit words are decoded to arrive at the raw or base band video data, i.e., 8 bit red, green and blue video and horizontal synchronization and vertical synchronization signals. The TMDS encoded 10 bit data words used by DVI are not suitable for processing by the receiver to help recover the clock signal as they tend to include a low number of bit transitions so as to help reduce EMI. Instead, the invention uses standard 8b10b encoding so that the 10 bit data words transmitted to the receiver are rich in bit transitions (i.e. low-high and high-low) so that it is easier to identify individual bits in the received data and hence determine data word boundaries in the received data and reduce received data errors. Hence, at 612, the raw or base band digital video data (8 bit R, G, B, Hsync and Vsync) is encoded using 8b10b encoding into 10 bit data words by 8b10b encoder logic 212 and using the de-jittered clock signal.

Then at 614, the output SERDES 216 serializes the parallel 10 bit data words for each colour into serial 10 bit data words and outputs three serial streams 218 of 10 bit data words, one for each colour. The stream of red video data is sent over the first twisted pair, the stream of green video data over the second twisted pair and the stream of blue video data over the third twisted pair to the receiver. As the data is transmitted in a different format of 8b10b encoding rich in bit transitions to improve signal regeneration by the receiver, it cannot immediately be used as a DVI signal, but instead the data must be transformed back into the 8b10b encoding format used by DVI.

Returning to FIG. 8, and referring to FIG. 3, at 576 the receiver video sub-system 300 determines that video data is being received over the twisted wire pairs and equalizer 164 amplifies the received video signals on each twisted wire pair. The amplified video signals are then passed to SERDES 314 which de-serializes the received video data into 10 bits of parallel data for each colour similarly to SERDES 206 and as illustrated in FIG. 11. Input SERDES 314 initially uses the approximate video clock signal output from de-jitter circuit 166 as a reference and generates an internal clock signal at at least the frequency of the incoming data that it is to de-serialize. The synthesised clock signal is accurate to approximately 20 ppm and the reference clock signal input to SERDES 314 only needs to be within ∓200 ppm of the actual DVI clock frequency in practice. SERDES 314 examines the edges of each incoming bit to try and determine the frequency of the incoming bits (which will be 10 times the frequency of the pixel clock frequency as the pixel words are 10 bits long) so as to determine the frequency and position for sampling the individual incoming bits. Then at 580, a process similar to that illustrated in FIG. 10 is carried out by logic 322 to try and identify data word boundaries. However, in the receiver, instead of identifying TMDS control bit patterns, logic 322 tries to identify bit patterns corresponding to control characters of the 8b10b encoding scheme used for the transmitted data. The 10 bit parallel data words for each colour are processed by logic 322 in order to align the individual pixel words between the colours at 582 so as to remove skew caused by the twisted pair cables. Logic 322 uses a process similar to that shown in FIG. 12 to determine the relative timing differences between the data words on each colour channel so as to determine which colour data words correspond to the same pixel.

Logic 322 also carries out error detection, similarly to logic 208, by comparing the received 10 bit data words with those permitted under the 8b10b encoding scheme to determine if any of the 10 bit data words include errors or not. The detected error rate is compared with a threshold at 584 to determine whether the error rate seems to indicate that the video signal has been successfully reconstituted from the received noisy data or not. Also, it is determined whether input SERDES 314 is managing to detect data bit boundaries reliably or not and so has locked onto the pixel clock frequency reliably or not. SERDES 314 provides a 'locked' signal when the frequency of its recovered clock signal matches ten times the data bit frequency. If the error signal is high then the video signal is not of sufficient quality and so processing returns to 592 and input SERDES 314 is re-set and attempts to lock to the data bit boundaries again. Also, even if the error rate is low, if logic 322 indicates that it has not been able to determine the data word boundaries for all three colours, then processing returns to 592 and input SERDES 314 is re-set and attempts to lock to the data word boundaries again.

Meanwhile, as SERDES 314 is identifying data bit boundaries it starts to generate a pixel clock signal which is recovered from the received colour data, as the pixel clock frequency is one tenth of the bit frequency. Without any knowledge of the clock signal frequency, SERDES 314 would not be able to determine data bit boundaries. However, the approximation of the clock frequency provides SERDES 314 with a good enough estimate of the clock frequency for SERDES 314 to be able to identify data bit boundaries and hence determine the actual pixel clock frequency with the level of accuracy required for the DVI clock frequency to be output. Hence, as data bit boundaries are successfully identified by SERDES 314 it starts to output a recovered pixel clock signal.

When it is determined 584 that error rate is low and logic 322 is successfully detecting data word boundaries for all three colours, then at 586, microprocessor 160 operates switch 308 so that the recovered pixel clock signal is used instead of the local approximate pixel clock signal. The recovered pixel clock signal is passed through 'divide by' circuit 336 to de-jitter device 166 and then the de-jittered recovered pixel clock signal is passed to the other components of the FPGA in place of the local approximate pixel clock signal.

Logic 322 also carries out 8b10b decoding on the received 10 bit data words to decode the transition rich 10 bit words back into the raw or base band 8 bit R, G, B, Hsync and Vsync data. The parallel 8 bit raw data is then passed to TMDS encoder 326 which carries out TMDS encoding back into the TMDS 10 bit data word format used by DVI. The parallel TMDS encoded data is then passed to output SER-DES 330 which serializes the data back into three serial 10 bit data streams, one for each colour. The DVI video data 332 is then output at 588 from output SERDES 330 to DVI buffer 334. Also the DVI pixel clock signal 333 is output from FPGA to the DVI buffer 334. Before the recovered pixel clock signal is available, the local approximation of the pixel clock frequency can be used to generate the DVI clock signal 333. When the recovered pixel clock frequency is available, then that is used to generate the DVI clock signal 333. Hence, the DVI signal 142 can then be output from the receiver 110 to the display device 104 and the receiver enters the generally steady state mode of operation.

As illustrated in FIG. 8, by process flow return line 590, the receiver constantly monitors the state of the video and whether the pixel clock remains locked for each colour. If the video quality reduces, for example because of noise on the cable, then the receiver can try to re-lock. Also, if the computer were to start transmitting DVI video data corresponding to a different display standard, then the receiver would try to re-lock to the newly received video data.

As will be appreciated there are other strategies for sending the pixel clock frequency information from the transmitter to the receiver which may work acceptably in some situations, while still avoiding sending the pixel clock signal at the same time that the colour data signals are being sent. For example, the receiver could interrogate the transmitter over the 4th twisted pair auxiliary channel and the transmitter could send the de-jittered measured frequency back over the 4th pair for the receiver to use as the approximate value of the pixel clock signal frequency. However, this may interrupt operation of the auxiliary channel which may be required for other purposes. Another strategy would involve comparing the recovered pixel clock signal frequency at the receiver with a measure of the frequency of the signal sent by the transmitter.

It will be appreciated that application of the invention is not limited to extenders. Rather, the invention can be used in a wide variety of applications and products.

Figure 15:
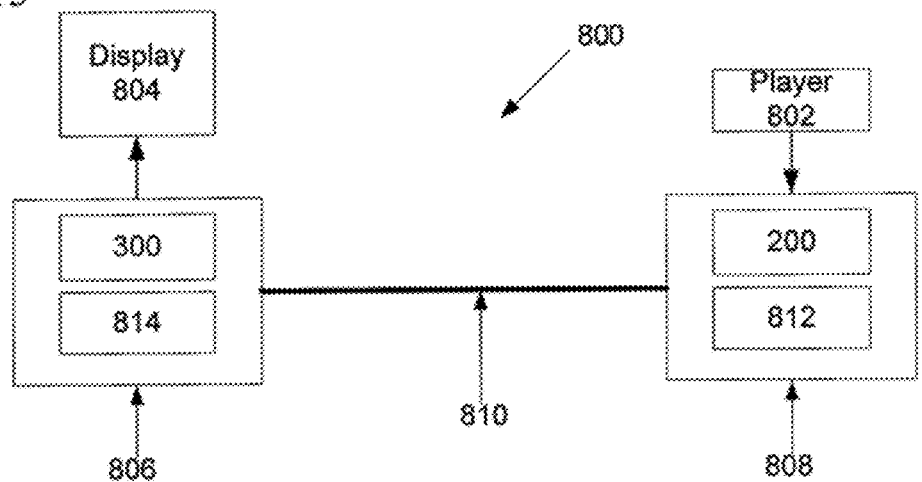
FIG. 15 shows a schematic block diagram of a signage system according to a further embodiment of the invention.

For example, in digital signage applications, as illustrated by digital signage system 800 in FIG. 15, it is often advantageous to locate a media player 802 at some distance from the display screen 804 so as to simplify the installation of the signage screens, improve security and simplify the maintenance of the media player. For convenience in such applications, it is also desirable to power the receiver unit 806 from the transmitter unit 808 by driving power down the connection cable 810 that links the transmitter 808 and the receiver 806. This arrangement 800 avoids the need to connect the receiver unit 806 to a power socket and is a convenience characteristic that is much appreciated by installers of signage screens as it makes for a very neat arrangement at the screen end which is often open to public view. The ability to send digital video data over three twisted pairs of a four-pair twisted pair cable 810 enables the fourth pair to be used to carry power.

A suitable voltage to use for such a line powering system is 24 volts. This is sufficiently high to avoid substantial losses in the cable 810 and sufficiently low to not pose an electrical shock hazard. To drive power down the cable, one of the conductors of the fourth or ancillary twisted pair is connected to 0 volts and the other conductor is connected to 24V. Hence, in a further embodiment of the invention a step-up voltage converter circuit 812 is provided at the transmitter end (either as part of or separate to the transmitter) to convert from the power supply's 5V to 24V and voltage regulator circuits 814 are provided at the receiver end (either as part of or separate to the receiver) to convert to the voltages required by the receiver end circuitry. Suitable voltage conversion circuits are within the knowledge of a person of ordinary skill in the art.

In applications that involve extending HDMI signals in particular, it is highly advantageous to be able to support HDCP (High-bandwidth Digital Content Protection) so that HDCP protected content, such as DVD video or Blu-ray disc content, can be displayed on the display device. HDCP requires a two-way communications channel between the video source and the sink or display device. On HDMI ports, this communication occurs over the DDC interface which is implemented as an i2c bus using serial clock (SCL) and data (SDA) lines.

Figure 16:
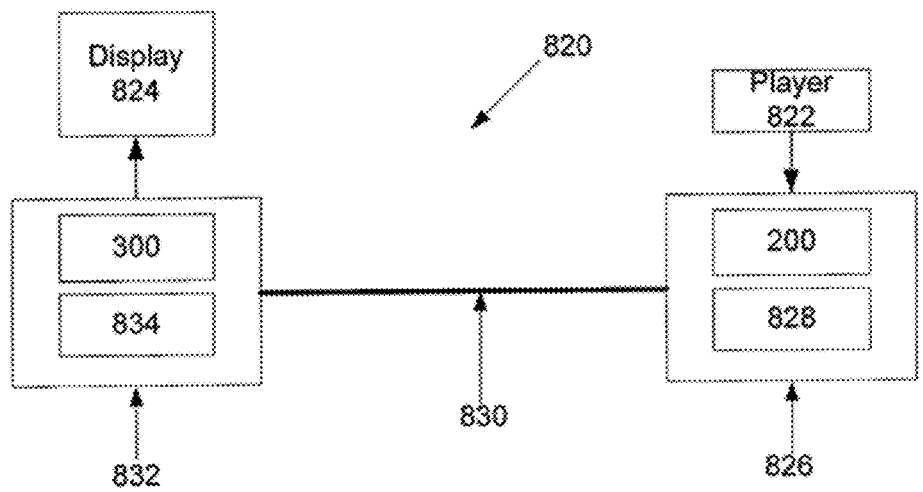
FIG. 16 shows a schematic block diagram of a system according to a further embodiment of the invention including an i2c channel.

Hence, a further embodiment of the invention provides a digital content protection system 820, as illustrated in FIG. 16, in which the fourth pair of the twisted pair cable 830 is used to implement a transparent i2c link between the source 822 and the sink 824. A transparent i2c link has the characteristic that the source and the sink are able to communicate together as if they were connected together using a wired i2c link. The transparent i2c link over a single twisted pair can be implemented at the transmitter 826 end by including a signal converter 828, (such as a National Semiconductor DS92LX2121) to convert the SDA and SCL signals into signals suitable for transmission over a single twisted pair of the cable 830 and vice versa. The transparent i2c link over a single twisted pair is implemented at the receiver 832 end using a further signal converter 834, (e.g. a National Semiconductor DS92LX2122) to convert the SDA and SCL signals into signals suitable for transmission over a single twisted pair and vice versa.

Figure 17:
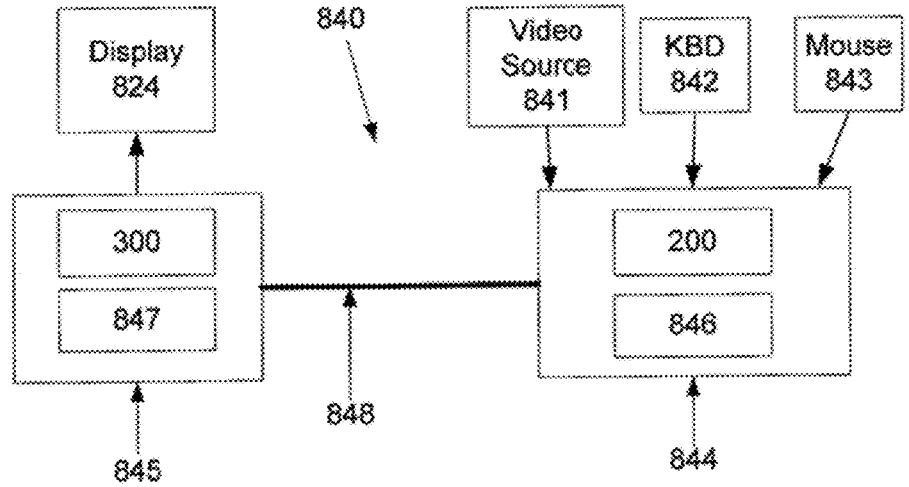
FIG. 17 shows a schematic block diagram of a system according to a further embodiment of the invention including a duplex auxiliary channel.

In a further embodiment, illustrated in FIGS. 17 and 18, the fourth twisted pair of the cable 848 can be used to carry a wide variety of different digital signals from the transmitter 844 to the receiver 845 that may be to and from one or more devices 842, 843. For example, the twisted pair could be used to carry PS/2 style keyboard 842 and mouse 843 data signals in a similar manner as implemented on the Adder-Link X2 Silver or sampled RS232 data signals in a similar manner as implemented on the AdderLink AV 200 series. A "hybrid" arrangement 850 as illustrated in FIG. 18 may be used on the twisted pair to enable duplex communications (both ways at the same time) rather than half duplex (one way a time) communications. Duplex circuitry is provided in both the transmitter 846 and the receiver 847.

The hybrid resistor network 850 illustrated in FIG. 18 works by subtracting the transmitted signal from the received signal and is a well know technique that has been implemented widely. It has the advantage that the signalling direction does not need to be switched as communication can occur in both directions at the same time. Driver 853 is an AD8131 in the described embodiment, but may be an RS485 style differential line driver in other embodiments. If the driver 853 drives a voltage V at 851 and minus V at 852 then the voltages at points 854 and 855 will be approximately V/2 and minus V/2 respectively due to the voltage dividing characteristics of the two 51 ohm resistors acting together with the fourth twisted pair 860 of the cable of characteristic impedance of 100 ohms that is terminated by 100 ohms. Then, from the resistor dividing action of the 2K and 1K resistors, the voltage at point 856 due to the driver 853 is zero and the voltage at point 857 due to the driver 853 is also zero. Hence, the voltages at points 856 and 857 are substantially independent of the voltages V and −V generated by the driver 853.

Other systems which may use the video subsystems of the transmitter and receiver described above would include an extended KVM switch. The extended KVM switch includes a single receiver video sub-system 300 and each remote computer would include its own local transmitter video sub-system. The KVM switch would also include conventional switching circuitry to allow the user to control a one of the remote computers from a user console including a keyboard, mouse and display device connected to the KVM switch. Each remote computer is then connected to its respective local transmitter circuit and the transmitter circuits to the KVM switch by their individual respective four-twisted wire pair cables.

It will be appreciated that various modifications and variations can be made to the specific embodiments described herein. It will also be appreciated that the invention can be applied in a wide variety of systems in which digital video signals need to be sent over longer distances and the invention is not limited to the specific systems described herein. It will further be appreciated that the drawings and flow charts are schematic only and are intended to be by way of explanation and illustration of the underlying concepts of the invention and not to be interpreted or read too literally. For example, various circuit components and devices are shown separately in the drawings simply for ease of explanation and in practice any combination or type of components, circuitry, hardware or software, can be used to provide the described functionality. Similarly, the process flow charts merely illustrate the intended functionality and fewer or a greater number of data processing steps may be present and, unless the context requires otherwise, the sequence of operations may not be important.

The invention claimed is:

1. A method for supplying a digital video signal from a source of digital video to a sink of digital video, wherein the digital video signal includes digital video data for three different colours and a pixel clock signal, the method comprising:
   receiving the digital video data and the pixel clock signal at a transmitter;
   measuring the frequency of the pixel clock signal at the transmitter;
   sending a signal representative of the frequency of the pixel clock signal over a cable connecting the transmitter and a receiver, wherein said signal representative of the frequency of the pixel clock signal is representative of the value of the frequency of the pixel clock signal measured at the transmitter;
   sending digital video data for three different colours over three different twisted wire pairs of the cable from the transmitter to the receiver;
   generating a local pixel clock signal at the receiver using the signal representative of the frequency of the pixel clock signal;
   using the local pixel clock signal to process the received digital video data sent over the three different twisted wire pairs by identifying data bit boundaries in the received digital video data to generate a recovered pixel clock signal at the receiver; and
   outputting from the receiver the digital video data and the recovered pixel clock signal that was generated at the receiver.

2. The method of claim 1, further comprising;
   de-jittering the pixel clock signal at the transmitter before measuring the frequency; and
   de-jittering the local pixel clock signal at the receiver before using the local pixel clock signal to process the received digital video data.

3. The method of claim 1, further comprising:
   switching to using the recovered pixel clock signal, instead of the local pixel clock signal, to process the received digital video data to recover the digital video data.

4. The method of claim 1 wherein the digital video data is sent in an 8 bit/10 bit encoding format having a higher average number of bit transitions per data word than an original 8 bit/10 bit encoding format in which the digital video data was originally received by the transmitter from the source.

5. The method of claim 4, further comprising: decoding the digital video data from the original encoding format;
   encoding the digital video data in a second encoding format having the higher average number of bit transitions per data word;
sending the digital video data encoded in the second encoding format; decoding the digital video data from the second encoding format; and encoding the digital video data in the original encoding format.

6. The method as claimed in claim 1, wherein
   generating said local pixel clock signal at the receiver further comprises instructing a programmable frequency multiplier of the receiver to output said local pixel clock signal.

7. The method as claimed in claim 1, and further comprising: identifying the location of data word boundaries in the digital video data by identifying a bit pattern corresponding to a control data word at the receiver and/or the transmitter.

8. The method of claim 7, wherein identifying the location of data word boundaries includes identifying the same bit pattern at a fixed position within different consecutive parts of the digital video data a plurality of consecutive times.

9. The method as claimed in claim 1, further comprising: aligning data words for the different colours corresponding to the same pixel, by identifying a data word corresponding to a control data word.

10. The method of claim 9, wherein aligning data words further includes identifying the same data word in digital video data for each colour and determining a timing off set for two of the colours relative to the third colour.

11. The method of claim 1 further comprising: de-serialising the digital video data into parallel digital video data for each colour; processing the parallel digital video data;
   re-serialising the parallel digital video data into serial digital video data for each colour;
   sending the serial digital video data from the transmitter to the receiver; de-serialising the digital video data into parallel digital video data for each colour; processing the parallel digital video data; and
   re-serialising the parallel digital video data into serial digital video data for each colour.

12. The method of claim 1, wherein said signal representative of the frequency of the pixel clock signal is sent over one of a first to third twisted wire pair of the cable subsequently used to send the digital video data from the transmitter to the receiver.

13. The method of claim 1, further comprising:
   sending auxiliary control signals or data signals over a fourth twisted wire pair of the cable, and wherein the signal representative of the frequency of the pixel clock signal is also sent over the fourth twisted wire pair of the cable.

14. The method of claim 13, further comprising: operating the fourth twisted wire pair as a transparent USB connection; or operating the fourth twisted wire pair as an i2c connection; or sending electrical power over the fourth twisted wire pair; or sending keyboard and/or mouse signals over the fourth twisted wire pair.

15. A system for supplying a digital video signal from a source of digital video to a sink of digital video, wherein the digital video signal includes digital video data for three different colours and a pixel clock signal, the system comprising:
   a transmitter connectable to a source of digital video; a receiver connectable to a sink of digital video; and
   a cable connectable to the transmitter and the receiver and including at least three twisted wire pairs, wherein the transmitter and receiver include between them circuitry configured to
   receive the digital video data and the pixel clock signal at a transmitter;
   measure the frequency of the pixel clock signal at the transmitter;
   send a signal representative of the frequency of the pixel clock signal over a cable connecting the transmitter and a receiver, wherein said signal representative of the frequency of the pixel clock signal is representative of the value of the frequency of the pixel clock signal measured at the transmitter;
   send digital video data for three different colours over three different twisted wire pairs of the cable from the transmitter to the receiver;
   generate a local pixel clock signal at the receiver using the signal representative of the frequency of the pixel clock signal;
   use the local pixel clock signal to process the received digital video data sent over the three different twisted wire pairs by identifying data bit boundaries in the received digital video data to generate a recovered pixel clock signal at the receiver; and
   output from the receiver the digital video data and the recovered pixel clock signal that was generated at the receiver.

16. A system for supplying a digital video signal from a source of digital video to a sink of digital video, wherein the digital video signal includes digital video data for three different colours and a pixel clock signal, the system comprising:
   a transmitter connectable to a source of digital video;
   and a receiver connectable to a sink of digital video, wherein: the transmitter includes:
      an input for receiving digital video from the source of digital video;
      an output connectable to a cable for connecting the transmitter to a receiver;
      circuitry to measure the frequency of the pixel clock signal at the transmitter and send a signal representative of the value of the measured frequency of the pixel clock signal measured at the transmitter to the output for transmission over the cable; and
      circuitry to send digital video data for three different colours to the output for transmission over three different twisted wire pairs of the cable, and wherein the receiver includes:
      an input connectable to a cable for connecting the receiver to a transmitter; circuitry to receive digital video data for three different colours from the input which has been transmitted over three different twisted wire pairs of the cable;
      circuitry to generate a local pixel clock signal using said signal representative of the value of the measured frequency of the pixel clock signal received over the cable;
      circuitry to process received digital video data by identifying data bit boundaries in the received digital video data using the local pixel clock to generate a recovered pixel clock signal at the receiver; and
      an output for passing the digital video data and the recovered pixel clock signal to the sink of digital video.

* * * * *